United States Patent [19]
Bailey et al.

[11] Patent Number: 6,084,880
[45] Date of Patent: *Jul. 4, 2000

[54] ASYNCHRONOUS TRANSFER MODE ADAPTER FOR DESKTOP APPLICATIONS

[75] Inventors: Chase B. Bailey, Highland Village; Klaus S. Fosmark, Dallas; Kenneth A. Lauffenberger, Carrollton; William A. Perry, Carrollton; Kevin S. Dibble, Carrollton, all of Tex.

[73] Assignee: Efficient Networks, Inc., Dallas, Tex.

[*] Notice: This patent is subject to a terminal disclaimer.

[21] Appl. No.: 08/885,603

[22] Filed: Jun. 30, 1997

Related U.S. Application Data

[63] Continuation of application No. 08/689,517, Aug. 9, 1996, abandoned, which is a continuation of application No. 08/304,349, Sep. 12, 1994, Pat. No. 5,548,587.

[51] Int. Cl.[7] .................................................. H04L 12/66
[52] U.S. Cl. ......................... 370/395; 370/463; 370/466; 370/474
[58] Field of Search ................................. 370/389, 395, 370/396, 397, 400, 401, 409, 411, 412, 465, 466, 474, 420, 421, 463, 469

[56] References Cited

U.S. PATENT DOCUMENTS

| | | | |
|---|---|---|---|
| 5,231,631 | 7/1993 | Buhrke et al. | 370/230 |
| 5,274,768 | 12/1993 | Traw et al. | 395/275 |
| 5,280,476 | 1/1994 | Kojima et al. | 370/397 |
| 5,311,509 | 5/1994 | Heddes et al. | 370/397 |
| 5,379,297 | 1/1995 | Glover et al. | 370/395 |
| 5,381,411 | 1/1995 | Ohno et al. | 370/232 |

(List continued on next page.)

FOREIGN PATENT DOCUMENTS

| | | | |
|---|---|---|---|
| 0130260 | 1/1985 | European Pat. Off. | H04L 5/14 |
| 0325794 | 12/1988 | European Pat. Off. | H04Q 11/04 |
| 9807282 | 4/1998 | WIPO . | |

OTHER PUBLICATIONS

"Traffic Management Specification Version 4.0" (af–tm–0056.000), *The ATM Forum Technical Committee*, Apr, 1996, 107 pages.

"Universal Serial Bus Class Definitions for Communication Devices," Version 1.1, *USB Implementer's Forum*, Jan. 19, 1999, 110 pages.

"ATM over ADSL Recommendations," *ADSL Forum Technical Report TR–002*, Mar. 1997, 23 pages.

"Framing and Encapulations Standards for ADSL: Packet Mode," *ADSL Forum WT–004, v3.0 Technical Report*, Mar. 1997, 16 pages.

Daniel Minoli and Michael Vitella, " ATM Cell Relay Service for Corporate Environments," New York: McGraw–Hill, Inc., 1994.

*Primary Examiner*—Ricky Ngo
*Attorney, Agent, or Firm*—Baker Botts L.L.P.

[57] ABSTRACT

An ATM adapter for desktop applications includes an adapter for interfacing an ATM network. The adapter includes an ATM application specific integrated circuit (ASIC). The ATM ASIC may interface with a data bus such as an SBus using a host interface circuit. The host interface circuit includes a bus interface, a DMA controller and a slave access controller. The DMA controller controls DMA operations within the ATM ASIC and associates with a RAM interface arbiter. The slave access controller controls operation of an interrupt circuit that goes to the SBus as well as a statistics circuit. The RAM interface arbiter arbitrates communication between the DMA controller, the slave access control circuit, a segmentation engine, and a reassembly engine. The RAM interface arbiter communicates with the RAM bus to a RAM associated with an adapter. The segmentation engine segments data into ATM format for transfer through a physical interface circuit. The physical interface circuit also receives formatted ATM information and sends that information to the reassembly engine. The reassembly engine reassembles the ATM data and transmits it through the RAM interface/arbiter circuit to the RAM bus. From the RAM bus, data may pass again through the RAM interface/arbiter to the DMA controller and onto the SBus through the host bus interface.

61 Claims, 27 Drawing Sheets

U.S. PATENT DOCUMENTS

| | | | |
|---|---|---|---|
| 5,414,707 | 5/1995 | Johnston et al. | 370/79 |
| 5,420,858 | 5/1995 | Marshall et al. | 370/60.1 |
| 5,430,721 | 7/1995 | Dumas et al. | 370/60.1 |
| 5,455,826 | 10/1995 | Ozveren et al. | 370/60 |
| 5,490,141 | 2/1996 | Lai et al. | 370/395 |
| 5,535,197 | 7/1996 | Cotton | 370/60 |
| 5,548,587 | 8/1996 | Bailey et al. | 370/60.1 |
| 5,557,607 | 9/1996 | Holden | 370/58.2 |
| 5,568,486 | 10/1996 | Huscroft et al. | 370/466 |
| 5,572,522 | 11/1996 | Calamvokis et al. | 370/60.1 |
| 5,583,861 | 12/1996 | Holden | 370/395 |
| 5,592,476 | 1/1997 | Calamvokis et al. | 370/390 |
| 5,600,650 | 2/1997 | Oskouy | 370/468 |
| 5,602,853 | 2/1997 | Ben-Michael et al. | 370/474 |
| 5,617,416 | 4/1997 | Damien | 370/391 |
| 5,625,625 | 4/1997 | Oskouy | 370/395 |
| 5,629,937 | 5/1997 | Hayter et al. | 370/233 |
| 5,701,292 | 12/1997 | Chiussi et al. | 370/232 |
| 5,726,985 | 3/1998 | Daniel et al. | 370/382 |
| 5,742,765 | 4/1998 | Wong et al. | 395/200.6 |
| 5,745,477 | 4/1998 | Zeng et al. | 370/230 |
| 5,751,709 | 5/1998 | Rathnavelu | 370/395 |
| 5,852,655 | 12/1998 | McHale et al. | 379/93.14 |

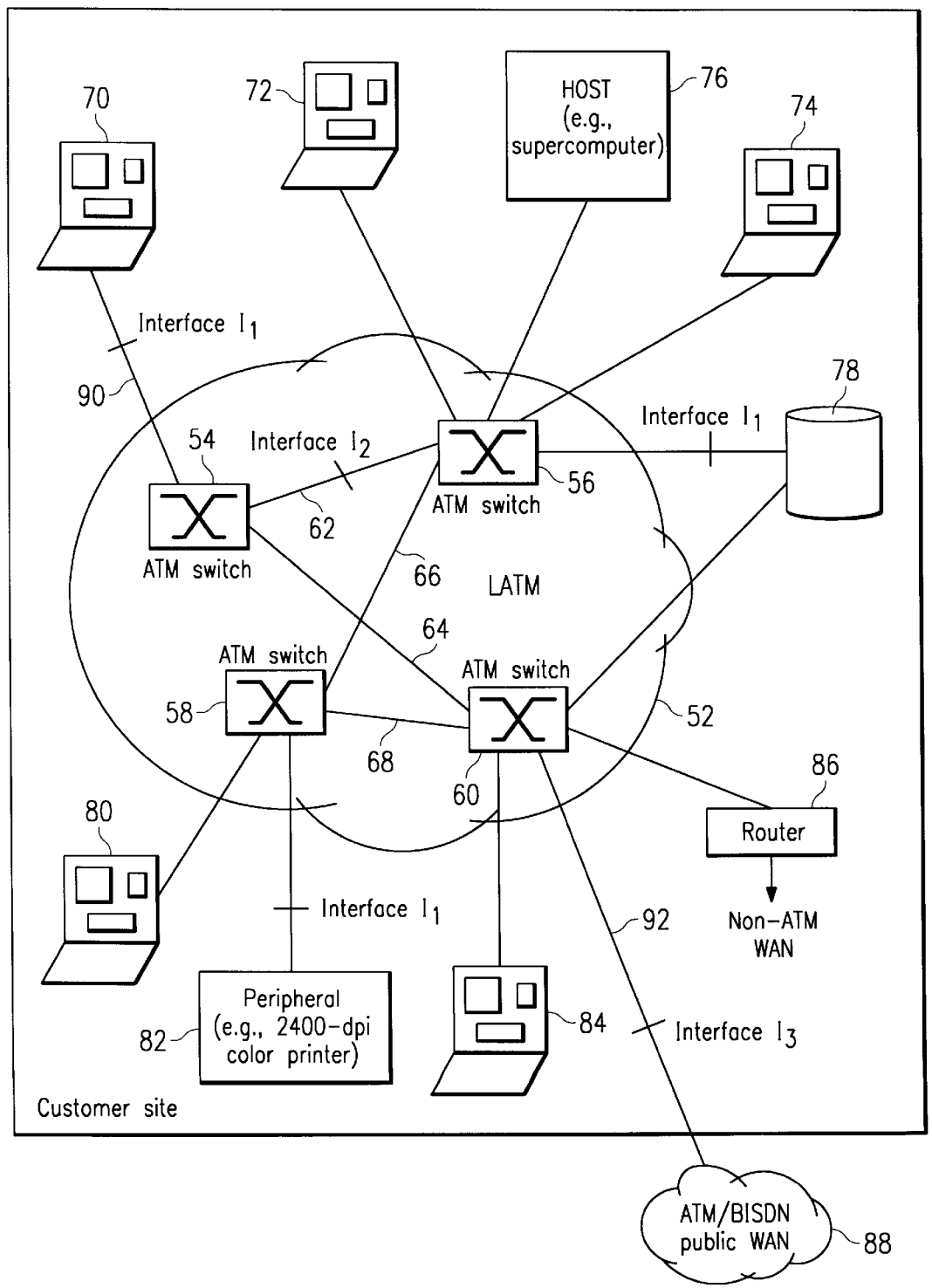

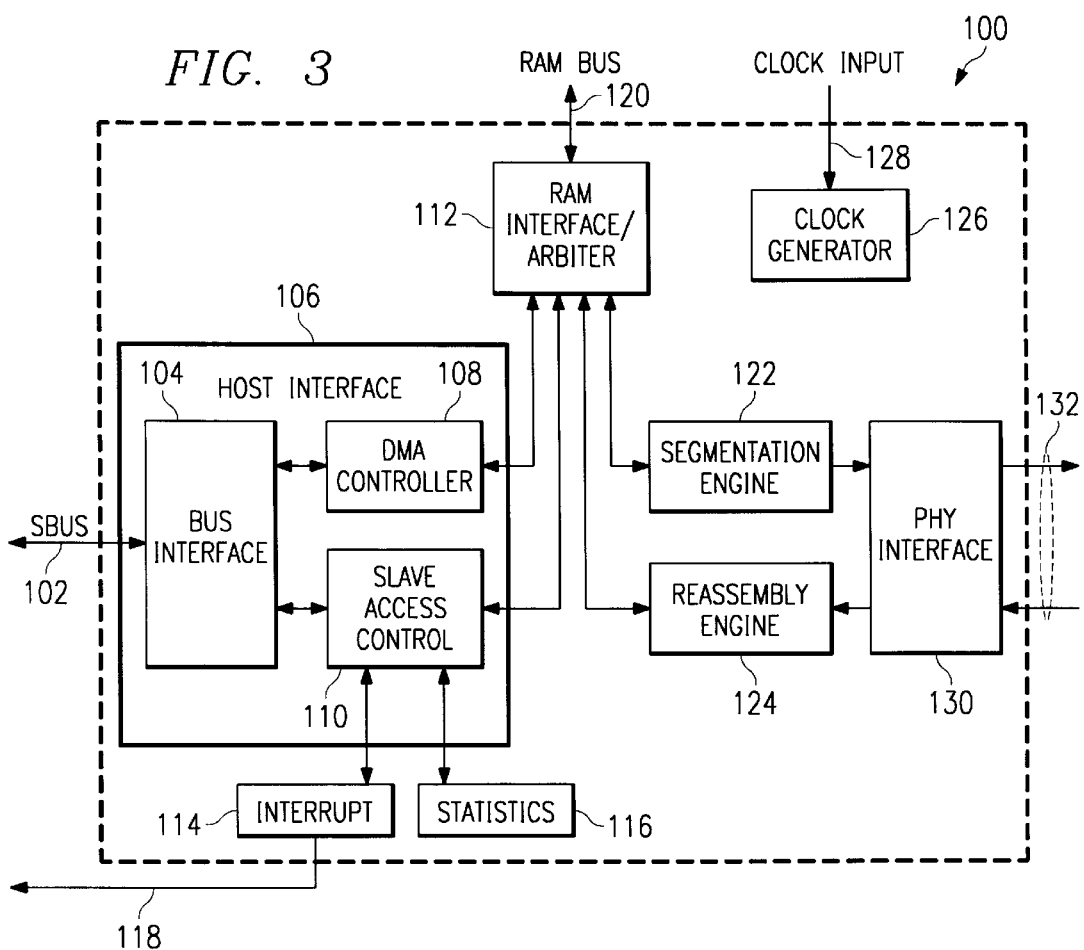

Register 0x00 (address 0x00): Midway Reset/ID Register (RES_ID_MCON)

| Bit | Type | Default | Name | Description |
|---|---|---|---|---|
| 31–28 | R | 0x0 | ID | When read returns Midway version number. This is version 0. |
| 27–11 | – | X | – | Not used, undefined when read. |
| 10–8 | R | – | MOTHER_ID | Mother board ID code. |
| 7 | R | – | CON_TI | 0: Normal controller i/f<br>1: [Reserved] |
| 6 | R | – | CON_SUNI | 0: UTOPIA i/f (see bit 5).<br>1: Async. SUNI i/f. |
| 5 | R | – | CON_V6 | 0: Non pipelined UTOPIA i/f<br>1: UTOPIA i/f<br>(Must be 0 when bit 6 is 1.) |
| 4–0 | R | – | DAUGHTER_ID | Daughter board ID code. |
| – | W | – | RESET | When written, the Midway is reset, all registers loaded with defaults. (The content of the data bus is ignored by the Midway). |

*FIG. 5*

Register 0x01 and 0x02 (address 0x04 and 0x08): Interrupt Status Acknowledge (ISA) and Interrupt Status (IS) Registers

| Bit | Type | Default | Name | Description |
|---|---|---|---|---|
| 31-17 | – | X | – | Not used, undefined when read. |
| 16 | R | 0 | TX_COMPLETE_7 | Interrupt indicating that channel 7 completed a PDU transmission. |
| 15 | R | 0 | TX_COMPLETE_6 | Interrupt indicating that channel 6 completed a PDU transmission. |
| 14 | R | 0 | TX_COMPLETE_5 | Interrupt indicating that channel 5 completed a PDU transmission. |
| 13 | R | 0 | TX_COMPLETE_4 | Interrupt indicating that channel 4 completed a PDU transmission. |
| 12 | R | 0 | TX_COMPLETE_3 | Interrupt indicating that channel 3 completed a PDU transmission. |
| 11 | R | 0 | TX_COMPLETE_2 | Interrupt indicating that channel 2 completed a PDU transmission. |
| 10 | R | 0 | TX_COMPLETE_1 | Interrupt indicating that channel 1 completed a PDU transmission. |
| 9 | R | 0 | TX_COMPLETE_0 | Interrupt indicating that channel 0 completed a PDU transmission. |
| 8 | R | 0 | TX_DMA_OVFL | Interrupt indicating that the DMA from host memory to adapter caused an overflow. |
| 7 | R | 0 | TX_IDEN_MISMTCH | Interrupt indicating that the Segmentation Engine found a mismatch in the Iden field of a Segmentation_buffer. RX_ENABLE, TX_ENABLE, and DMA_ENABLE are cleared. |
| 6 | R | 0 | DMA_LERR_ACK | Interrupt indicating that a DMA operation received an LERR acknowledgement. |
| 5 | R | 0 | DMA_ERR_ACK | Interrupt indicating that a DMA operation received an error acknowledgement. |
| 4 | R | 0 | RX_DMA_COMPLETE | Interrupt indicating that a DMA from adapter memory to host memory has been completed. |
| 3 | R | 0 | TX_DMA_COMPLETE | Interrupt indicating that a DMA transfer from host memory to adapter memory has been completed. |
| 2 | R | 0 | SERVICE | Interrupt indicating that something has been put in the Service_list. |
| 1 | R | X | SUNI_INT | Interrupt indicating that the SUNI chip has the interrupt pin low. |
| 0 | R | 0 | STAT_OVFL | Interrupt indicating overflow on either VCI_Trash or Ovfl_Trash statistics counters. |

FIG. 6

Register 0x03 (address 0x0C): Interrupt Enable Register (IE)

| Bit | Type | Default | Name | Description |
|---|---|---|---|---|
| 31-17 | - | X | - | Not used, undefined when read. |
| 16 | R/W | 0 | EN_TX_COMPLETE_7 | Enable TX_COMPLETE_7 Interrupts. |
| 15 | R/W | 0 | EN_TX_COMPLETE_6 | Enable TX_COMPLETE_6 Interrupts. |
| 14 | R/W | 0 | EN_TX_COMPLETE_5 | Enable TX_COMPLETE_5 Interrupts. |
| 13 | R/W | 0 | EN_TX_COMPLETE_4 | Enable TX_COMPLETE_4 Interrupts. |
| 12 | R/W | 0 | EN_TX_COMPLETE_3 | Enable TX_COMPLETE_3 Interrupts. |
| 11 | R/W | 0 | EN_TX_COMPLETE_2 | Enable TX_COMPLETE_2 Interrupts. |
| 10 | R/W | 0 | EN_TX_COMPLETE_1 | Enable TX_COMPLETE_1 Interrupts. |
| 9 | R/W | 0 | EN_TX_COMPLETE_0 | Enable TX_COMPLETE_1 Interrupts. |
| 8 | R/W | 0 | EN_TX_DMA_OVFL | Enable TX_DMA_OVFL interrupts. |
| 7 | R/W | 0 | EN_TX_IDEN_MISMTCH | Enable TX_IDEN_MISMTCH interrupts. |
| 6 | R/W | 0 | EN_DMA_LERR_ACK | Enable DMA_LERR_ACK interrupts. |
| 5 | R/W | 0 | EN_DMA_ERR_ACK | Enable DMA_ERR_ACK interrupts. |
| 4 | R/W | 0 | EN_RX_DMA_COMPLETE | Enable RX_DMA_COMPLETE interrupts. |
| 3 | R/W | 0 | EN_TX_DMA_COMPLETE | Enable TX_DMA_COMPLETE interrupts. |
| 2 | R/W | 0 | EN_SERVICE | Enable SERVICE interrupts. |
| 1 | R/W | 0 | EN_SUNI_INT | Enable SUNI_INT interrupts. |
| 0 | R/W | 0 | EN_STAT_OVFL | Enable STAT_OVFL interrupts. |

*FIG. 7*

Register 0x04 (address 0x10): Master Control/Status Register (MC_S) FIG. 8

| Bit | Type | Default | Name | Description |
|---|---|---|---|---|
| 31–9 | – | X | – | Not used, undefined when read. |
| 8–6 | R/W | 0x0 | INT_SELECT | Select interrupt level:<br>000: Interrupts disabled<br>001: INTREQn<1> used<br>010: INTREQn<2> used<br>...<br>111: INTREQn<7> used |
| 5 | R/W | 0 | TX_LOCK_MODE | When 0: Segmentation "streaming mode" on overflow<br>When 1: Segmentation locks on overflow. |
| 4 | R/W | 0 | DMA_ENABLE | Enable DMA operations.<br>When read:<br>0: Disabled<br>1: Enabled<br>When written:<br>0: Don't change<br>1: Enable DMA operations |
| 3 | R/W | 0 | TX_ENABLE | Enable Segmentation Engine.<br>When read:<br>0: Disabled<br>1: Enabled<br>When written:<br>0: Don't change<br>1: Enable Segmentation Engine |
| 2 | R/W | 0 | RX_ENABLE | Enable Reassembly Engine.<br>When read:<br>0: Disabled<br>1: Enabled<br>When written:<br>0: Don't change<br>1: Enable Reassembly Engine |
| 1 | R/W | 0 | WAIT_1MS | Interrupts are disabled for 1 ms.<br>When read:<br>0: Timer not running<br>1: Timer running<br>When written:<br>0: Don't change<br>1: Start 1ms timer |
| 0 | R/W | 0 | WAIT_500US | Interrupts are disabled for 0.5 ms.<br>When read:<br>0: Timer not running<br>1: Timer running<br>When written:<br>0: Don't change<br>1: Start 0.5ms timer |

Register 0x05 (address 0x14): Statistics Register (STAT)

| Bit | Type | Default | Name | Description |
|---|---|---|---|---|
| 31-16 | R | - | VCI_Trash | The count of trashed cells because of VCI mode set to Trash. |
| 15-0 | R | - | Ovfl_Trash | The count of trashed cells because of overflow. |

*FIG. 9*

Register 0x06 (address 0x18): ServWrite Register (SERV_WRITE)

| Bit | Type | Default | Name | Description |
|---|---|---|---|---|
| 31-10 | - | 0x0 | - | Not used, 0 when read. |
| 9-0 | R | 0 | ServWrite | Points to the next free position to be written when the next PDU is to be put in the Service_list. |

*FIG. 10*

Register 0x07 (address 0x1C): DMA Address Register (DMA_ADDR)

| Bit | Type | Default | Name | Description |
|---|---|---|---|---|
| 31-0 | R | 0 | DMA_ADDR | The virtual address used for DMA. Can be read by the host for debugging purposes. |

*FIG. 11*

Register 0x08 (address 0x20): DMAWr_rx Register (DMA_WR_RX)

| Bit | Type | Default | Name | Description |
|---|---|---|---|---|
| 31-9 | - | 0x0 | - | Not used, 0 when read. |
| 8-0 | R/W | 0 | DMAWr_rx | Points to the next free position to be written when the host wants to enqueue another block for DMA from adapter to host memory. |

*FIG. 12*

Register 0x09 (address 0x24): DMARd_rx Register (DMA_RD_RX)

| Bit | Type | Default | Name | Description |
|---|---|---|---|---|
| 31-9 | - | 0x0 | - | Not used, 0 when read. |
| 8-0 | R | 0 | DMARd_rx | Points to the descriptor currently being processed or about to be processed by the Midway. |

*FIG. 13*

Register 0x0A (address 0x28): DMAWr_tx Register (DMA_WR_TX)

| Bit | Type | Default | Name | Description |
|---|---|---|---|---|
| 31-9 | - | 0x0 | - | Not used, 0 when read. |
| 8-0 | R/W | 0 | DMAWr_tx | Points to the next free position to be written when the host wants to enqueue another block for DMA from host to adapter memory. |

*FIG. 14*

Register 0x0B (address 0x2C): DMARd_tx Register (DMA_RD_TX)

| Bit | Type | Default | Name | Description |
|---|---|---|---|---|
| 31-9 | - | 0x0 | - | Not used, 0 when read. |
| 8-0 | R | 0 | DMARd_tx | Points to the descriptor currently being processed or about to be processed by the Midway. |

*FIG. 15*

Register 0x0C - 0x0F: (Not used)

Register (0x10+(4 * channel)) (address 0x40+(0x10 * channel)):
Transmit Place Registers (TX_PLACE)

| Bit | Type | Default | Name | Description |
|---|---|---|---|---|
| 31-14 | - | X | - | Not used, undefined when read. |
| 13-11 | R/W | 0x0 | Size | 8 different sizes are defined for Segmentation_queues:<br>"000"-256,<br>"001"-512,<br>"010"-1K,<br>...<br>"111"-32K times 32 bit. |
| 10-0 | R/W | 0x00 | Location | The (up to) 11 most significant bits of the address location of the corresponding Segmentation_queue in adapter memory. The (up to) 7 least significant bits of this field must be zero (determined by Size). |

*FIG. 16*

Register (0x11+(4 * channel)) (address 0x44+(0x10 * channel)):
Transmit ReadPtr Registers (TX_RDPTR)

| Bit | Type | Default | Name | Description |
|---|---|---|---|---|
| 31-15 | - | 0x0 | - | Not used, 0 when read. |
| 14-0 | R | 0x00 | ReadPtr | Points to the next 32 bit word to be transferred to the PHY. The (up to) 7 most significant bits of this field will be zero (determined by Size). |

*FIG. 17*

Register (0x12+(4 * channel)) (address 0x48+(0x10 * channel)):
Transmit DescrStart Registers (TX_DESCRSTART)

| Bit | Type | Default | Name | Description |
|---|---|---|---|---|
| 31-15 | - | 0x0 | - | Not used, 0 when read. |
| 14-0 | R | 0x00 | DescrStart | Points to the start of the Segmentation_buffer (its descriptor) currently being DMAed into the Segmentation_queue. (Bit 0 is always 0). The (up to) 7 most significant bits of this field will be zero (determined by Size). |

*FIG. 18*

Absolute Maximum Ratings:

*FIG. 24*

| Parameter | Min | Max | Unit |
|---|---|---|---|
| Ambient operating temperature under bias: | −40 | +85 | °C |
| Storage temperature | −40 | +125 | °C |
| Supply voltage | −0.5 | +6.0 | V |
| Input voltage | −0.5 | VDD+0.5 | V |
| DC input current | −8 | 8 | mA |
| Lead temperature |  | +300 | °C |
| Junction temperature |  | +150 | °C |

Recommended operating conditions:

*FIG. 25*

| Parameter | Min | Max | Unit |
|---|---|---|---|
| Ambient operating temperature: | 0 | +70 | °C |
| Supply Voltage | +4.75 | +5.25 | V |
| Input high voltage | +2.0 | VDD+0.5 | V |
| Input low voltage | −0.5 | +0.8 | V |
| Output high voltage (note 1) | +2.8 |  | V |
| Output low voltage |  | +0.4 | V |
| Input leakage current | −10 | +10 | uA |
| 3-state output leakage current | −10 | +10 | uA |
| DC output current (note 2) | 0 | 0 | mA |

*FIG. 26*

| Access to | Read | | Write | |
|---|---|---|---|---|
|  | Access time | Wait states at 25MHz | Access time | Wait states at 25 MHz |
| RAM | 320−400ns | 5−7 | 120−200ns | 0−2 |
| Internal regs. | 280−320ns | 4−5 | 120−200ns | 0−2 |
| PHY | 440−480ns | 8−9 | 120−200ns | 0−2 |
| ((E)E)PROM | 520−560ns | 10−11 | 480−520ns | 9−10 |

Segmentation_Control_block fields for channel 0-7     FIG. 32

| Field Name | Size (bits) | Host Access | Midway Access | Description |
|---|---|---|---|---|
| Location | 11 | R/W | R | The (up to) 11 most significant bits of the address location of the corresponding Segmentation_queue in adapter memory. The Size field determines the number of bits in the location field used by the Midway to build the 19 bit address (see APPENDIX E:LOCATION/SIZE PARAMETERS). The (up to) 7 least significant bits of this field must be zero (determined by Size). |
| Size | 3 | R/W | R | 8 different sizes are defined for Segmentation_queues: 256, 512, 1K, 2K, 4K, 8K, 16K, and 32K times 32 bit (i.e. from 1K to 128K bytes). When 256 is selected, all bits of Location are used. When 32K is selected, only the 4 most significant bits of Location are used (see APPENDIX E: LOCATION/SIZE PARAMETERS). |
| ReadPtr | 15 | R | R/W | Points to the next 32 bit word to be segmented. When waiting to transmit a PDU, ReadPtr is compared with DescrStart. If different, Midway starts segmentation. The (up to) 7 most significant bits of this field are zero (determined by Size). |
| DescrStart | 14 | R | R/W | Points to the start of the Segmentation_buffer (its descriptor) currently being DMAed into the Segmentation_queue. This pointer is advanced when the whole PDU has been DMAed to adapter memory. The (up to) 7 most significant bits of this field are zero (determined by Size). |
| CRC | 32 | – | R/W | Contains the tempoary CRC value being calculated for the PDU currently being segmented. |
| CellCount | 11 | – | R/W | Contains the tempoary cell count for the PDU currently being segmented. Loaded from the segmentation queue, and counted down for each segmented cell. |
| ATM_header | 14 | – | R/W | Cell header for the current PDU segmentation (VCI, PTI, and CLP). Loaded from the segmentation queue. |
| Prescale | 2 | – | R/W | Prescale value for the PCR rate for the current PDU segmentation. Loaded from the segmentation queue. |
| Rate_Resolution | 6 | – | R/W | Resolution value for the PCR rate for the current PDU segmentation. Loaded from the segmentation queue. |

Pointers to the DMA_Transmit_queue

| Field Name | Size (bits) | Host Access | Midway Access | Description |
|---|---|---|---|---|
| DMAWr_tx | 9 | R/W | R | Points to the next free position to be written when the host wants to enqueue another block for DMA. The host is required to compare DMAWr_tx and DMARd_tx before a write operation to avoid overflows. |
| DMARd_tx | 9 | R | R/W | Points to the descriptor currently being processed or about to be processed by the Midway. Midway compares DMAWr_tx with DMARd_tx to avoid underflows. |

FIG. 34

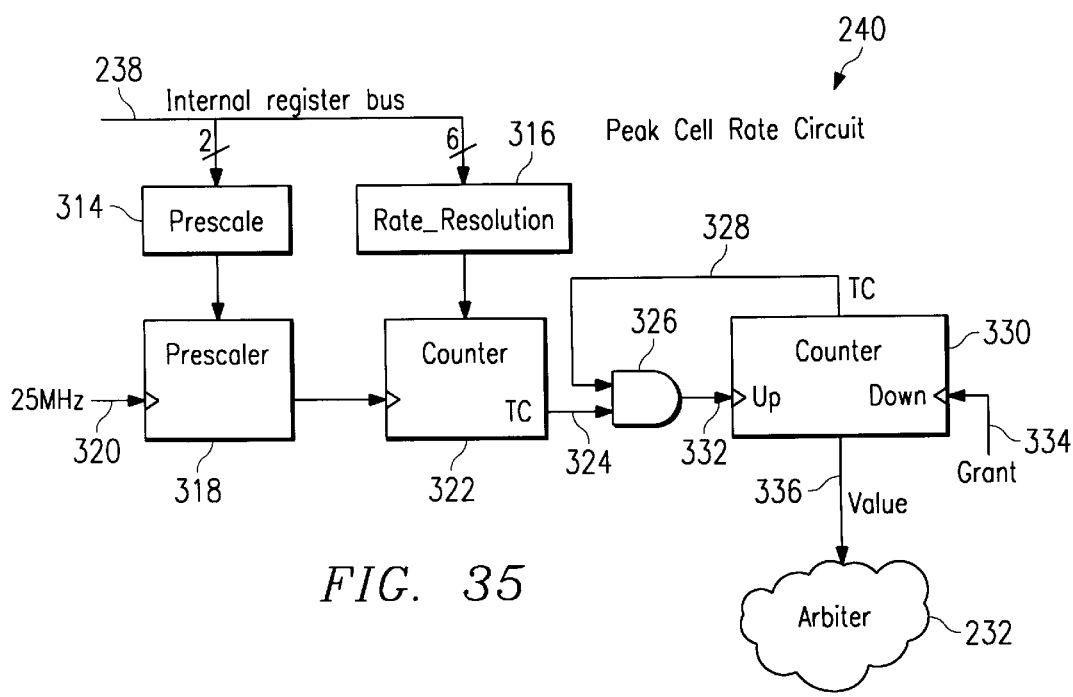

FIG. 35

PCR Rates

*FIG. 36*

| Pr | Prescale Divisor | Rate_ Resolution | PCR rate [bits/sec] | PCR rate [cells/sec] |
|---|---|---|---|---|
| "00" | 4 | 0-16<br>17<br>18<br>...<br>62<br>63 | Full speed<br>147.2 Mb/s<br>139.5 Mb/s<br>...<br>42.1 Mb/s<br>41.4 Mb/s | Full speed<br>347222.2 cells/sec<br>328947.4 cells/sec<br>...<br>99206.3 cells/sec<br>97656.2 cells/sec |
| "01" | 16 | 0-3<br>4<br>5<br>...<br>62<br>63 | Full speed<br>132.5 Mb/s<br>110.4 Mb/s<br>...<br>10.5 Mb/s<br>10.4 Mb/s | Full speed<br>312500 cells/sec<br>260416.7 cells/sec<br>...<br>24801.6<br>24414.1 cells/sec |
| "10" | 128 | 0<br>1<br>...<br>62<br>63 | 82.8 Mb/s<br>41.4 Mb/s<br>...<br>1.31 Mb/s<br>1.29 Mb/s | 195312.5 cells/sec<br>97656.3 cells/sec<br>...<br>3100.2 cells/sec<br>3051.8 cells/sec |
| "11" | 2048 | 0<br>1<br>...<br>62<br>63 | 5.18 Mb/s<br>2.59 Mb/s<br>...<br>82.2 kb/s<br>80.9 kb/s | 12207.0 cells/sec<br>6103.5 cells/sec<br>...<br>193.8 cells/sec<br>190.7 cells/sec |

| Size | RAM block | Address |
|---|---|---|
| "000"-0 | 1KB | Location<10-0> concatenated with Offset<7-0> |
| "001"-1 | 2KB | Location<10-1> concatenated with Offset<8-0> |
| "010"-2 | 4KB | Location<10-2> concatenated with Offset<9-0> |
| "011"-3 | 8KB | Location<10-3> concatenated with Offset<10-0> |
| "100"-4 | 16KB | Location<10-4> concatenated with Offset<11-0> |
| "101"-5 | 32KB | Location<10-5> concatenated with Offset<12-0> |
| "110"-6 | 64KB | Location<10-6> concatenated with Offset<13-0> |
| "111"-7 | 128KB | Location<10-7> concatenated with Offset<14-0> |

*FIG. 37*

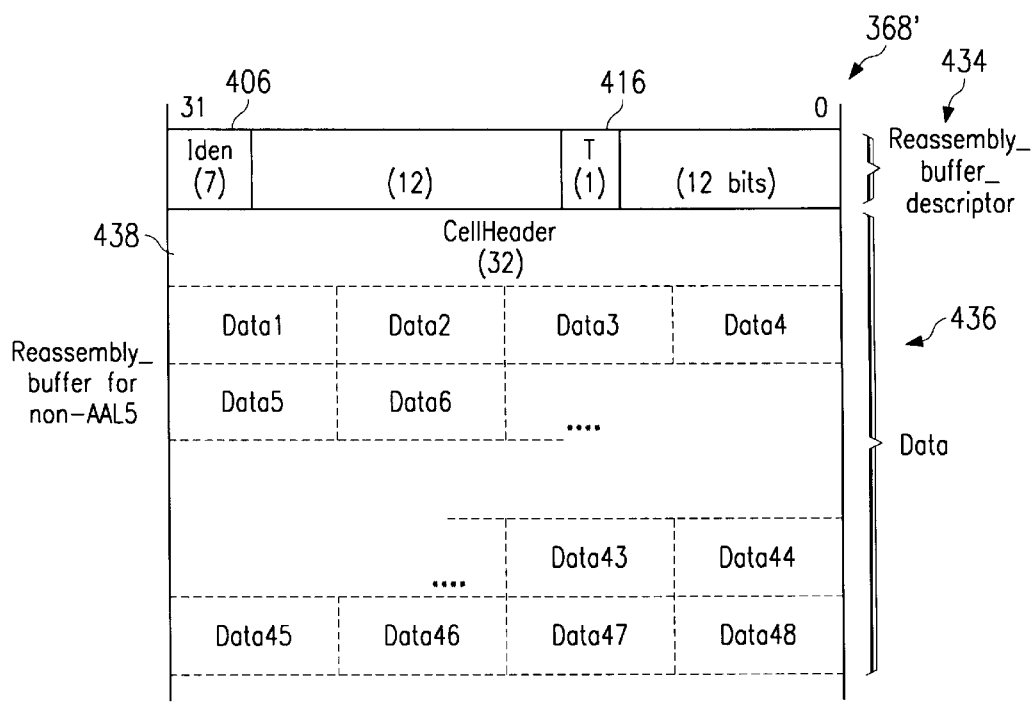
FIG. 42
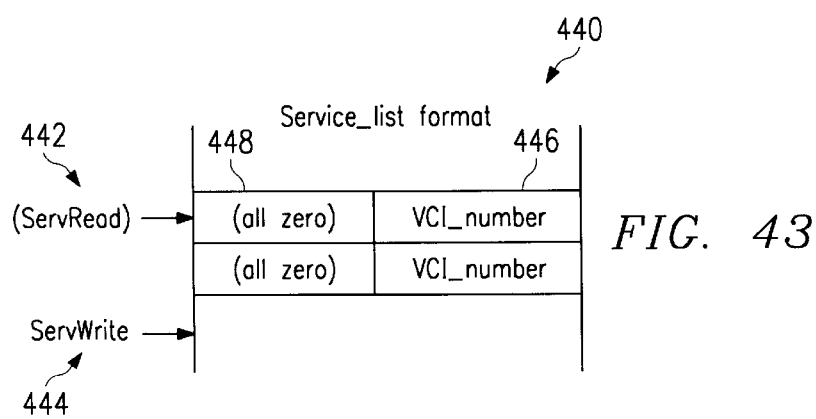
FIG. 43
Pointers to the Service_list
| Field Name | Size (bits) | Host Access | Midway Access | Description |
|---|---|---|---|---|
| ServWrite | 10 | R | R/W | Word offset that points to the next free position to be written when the next PDU is to be put in the list. |
FIG. 44

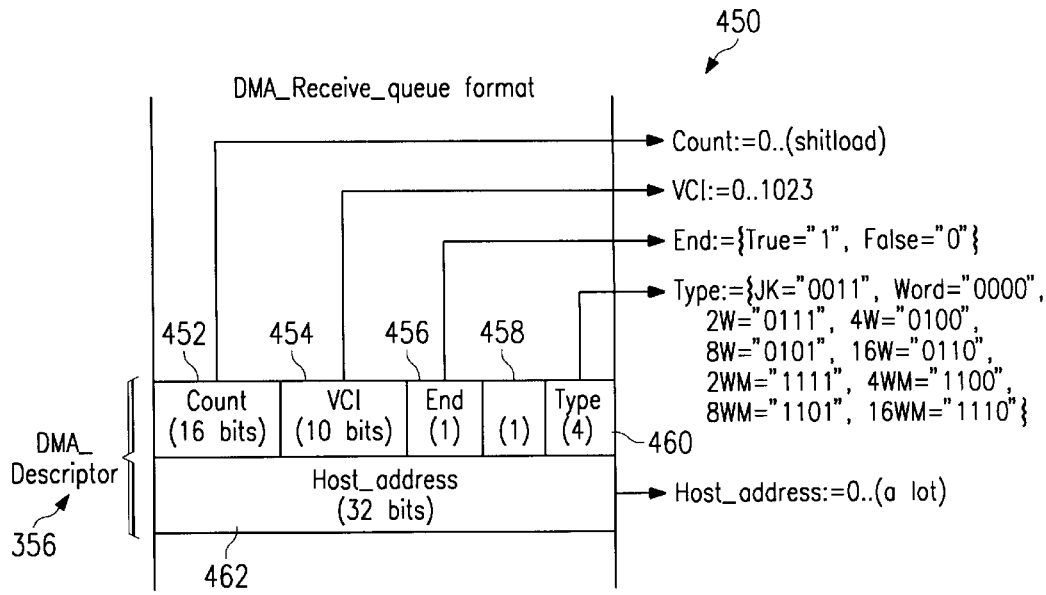

FIG. 45

| Field Name | Size (bits) | Host Access | Midway Access | Description |
|---|---|---|---|---|
| DMAWr_rx | 9 | R/W | R | Word pointer to the next free position to be written when the host wants to enqueue another block for DMA. THe host is required to compare DMAWr_rx and DMARd_rx before a write operation to avoid overflows. |
| DMARd_rx | 9 | R | R/W | Word pointer to the descriptor currently being processed or about to be processed by the Midway. Midway compares DMAWr_rx with DMARd_rx to avoid underflows. |

Pointers to the DMA_Receive_queue

FIG. 46

Host Interface Pins

| Pin Name | Pin Number | Direction | Drive/Load | Description |
|---|---|---|---|---|
| ACK<2:0> | 98,96,95 | I/O | 160pF | SBUS Transfer acknowledgment. Input when master, Output when slave. (ar<2:0> for in RAM test mode) |
| LERRn | 110 | I | | SBUS Late data error. (ar<3> for in RAM test mode) |
| CLK | 78 | I | | SBUS clock (16-25 MHz) |
| BGn | 111 | I | | SBUS bus grant signal (web in RAM test mode, scan-in-2 in scan mode) |
| BRn | 45 | O | 160pF | SBUS bus request signal (Scan-out-2 in scan mode) |
| ASn | 46 | I | | SBUS Address Strobe signal (aw<3> in RAM test mode) |
| D<31:0> | 24,27-31,35-40,42-44,74-72,70-68,63-59,57-54,48,47 | I/O | 160pF | SBUS data lines (Data output in RAM test mode) |
| INTREQn<7:1> | 90,84,75,71,64,58,52 | O | 160pF (open drain) | Interrupt requests |
| SIZ<2:0> | 102,99,97 | I/O | 160pF | SBUS Transfer Size. Input when slave, Output when master. (aw<2:0> for in RAM test mode) |
| SELn | 41 | I | | SBUS Slave Select |
| PA<21:2> | 122,118,115, 114,109-105, 94-92,87-85, 83-80 | I | | SBUS Physical Address. (PA<21> determines RAM or scan in scan mode) |
| READ | 91 | I/O | 160pF | SBUS Transfer Direction. Input when slave, Output when master. |
| RESETn | 144 | I | | SBUS Reset |

*FIG. 48*

RAM, EPROM, SUNI Interface Pins

| Pin Name | Pin Number | Direction | Load/Drive | Description |
|---|---|---|---|---|
| E_CSn | 145 | O | 10pF | EPROM chip select (Scan-out-1 in scan mode) |
| G_CSn | 146 | O | 10pF | General purpose chip select |
| S_INTn | 131 | I | pu | Interrupt request from phy chip (Scan-in-1 in scan mode) |
| ADR<18:0> | 23-20,16-12,7, 6,186,187,189, 190,192,193, 198,199 | O | 70pF | Address lines 18-0 |
| DATA<31:0> | 119-121,123-127,130,132-134,138-143, 150-155,170-172,175-179 | I/O | 70pF pu on <31:11> | Data lines 31-0 (Data input in RAM test mode) |
| CEn<1:4> | 8-11 | O | 10pF | RAM chip selects. CEn<1> active for DATA<31:24>,..., CEn<4> active for DATA<7:0>. |
| OEn | 113 | O | 40pF | Output Enable |
| S_CSn | 191 | O | 10pF | SUNI chip select (Sel in TI mode) |
| WEn | 188 | O | 50pF | Write Enable (R/W in TI mode) |

FIG. 49

Miscellaneous Pins

| Pin Name | Pin Number | Direction | Drive | Description |
|---|---|---|---|---|
| SMn | 103 | I | pu | Scan Mode control signal (low during scan test) |
| OSCin | 183 | I | | Oscillator input pin (master clock input). |
| VDD | 3,18,26,33,50,66,77,89,101, 104,117,129,136,148,162, 174,181,184,195,208 | | (20 pins) | +5 volt D.C. power |
| VSS | 2,17,19,25,32,34,49,51,53,65, 67,76,79,88,100,116,128, 135,137,147,149,157,161, 173,180,182,185,194,197 | | (29 pins) | Ground |

FIG. 51

PHY Interface Pins

| Pin Name | Pin Number | Direction | Drive | Description |
|---|---|---|---|---|
| RTCLK | 196 | O | 30pF | Transfer/synchronization clock for synchronizing transfers in both directions |
| RDAT<7:0> | 156,158-160, 163-166 | I | | Received cell data from the PHY chip. RDAT<7> is the MSB<br>(RDAT<0> is scan-in-3 in scan mode)<br>(RDAT<1> is scan-in-4 in scan mode)<br>(RDAT<2> is scan-in-5 in scan mode) |
| EMPTYn | 168 | I | | When asserted, Midway will assume that RDAT is not valid data. When in SUNI mode, this pin is RCA.<br>(Scan Enable (inv) in scan mode) |
| RENBn | 169 | O | 15pF | Asserted to indicate that RDAT and RSOC will read by Midway. When in SUNI mode, this pin is RRDB. |
| RSOC | 167 | I | | When asserted, RDAT assumed to contain the first byte of a cell. |
| TDAT<7:0> | 5,4,1,207-203 | O | 15pF | Transmit cell data. TDAT[7] is the MSB.<br>(TDAT<0> is scan-out-3 in scan mode)<br>(TDAT<1> is scan-out-4 in scan mode)<br>(TDAT<2> is scan-out-5 in scan mode) |
| TENBn | 200 | O | 15pF | Asserted during cycles when TDAT contains vaild cell data. When in SUNI mode, this pin is TWRB. |
| FULLn | 201 | I | | When asserted, Midway will stop writing bytes to the phy chip. When in SUNI mode, this pin is TCA. |
| TSOC | 202 | O | 15pF | Asserted when TDAT contains the first byte of the cell. |

FIG. 50

ASYNCHRONOUS TRANSFER MODE ADAPTER FOR DESKTOP APPLICATIONS

CROSS REFERENCE TO RELATED APPLICATIONS

This application is a continuation of application Ser. No. 08/689,517, filed Aug. 9, 1996, now abandoned; which is a continuation of application Ser. No. 08/304,349, filed Sep. 12, 1994 by Chase B. Bailey, Klaus. S. Fosmark, Kenneth A. Lauffenberger, William A. Perry and Kevin S. Dibble entitled "Asynchronous Transfer Mode Adapter for Desktop Applications," now U.S. Pat. No. 5,548,587, issued , Aug. 20, 1996.

TECHNICAL FIELD OF THE INVENTION

The present invention is generally concerned with data communication systems and methods for transmitting and exchanging electronic data between two points and, more particularly, to an asynchronous transfer mode (ATM) adapter for providing ATM capability in a workstation or desktop environment.

BACKGROUND OF THE INVENTION

In today's telecommunications and data processing industries, high speed, low-cost distribution and exchange of large amounts of information has become highly important. Manufacturing companies desire to distribute CAD/CAM design activities among premises. Publishing companies seek to design layouts electronically and share them among groups at different sites. Hospitals want to share detailed medical records in near real time. Until recently, all of these activities have been constrained by technology to a single building or campus. Companies have needs to lift constraints by using real-time networking technologies to replace overnight courier delivery. There is also a trend in both commerce and government toward data center consolidation. Organizations would like to serve local work groups from remote data centers. They need networking to do that and they need networking to back up these new, consolidated data centers so that they do not become a single point of failure for their entire operation.

Something that all these applications have in common is that they require that bits be passed at speeds higher than conventional T1 rate of 1.544 Mbps. Some applications demand higher speed on a sustained basis. Some applications require more bandwidth so that a burst can be delivered quickly. T1 or slower is what is typically installed in a wide area network. This represents a mismatch with the local area where the slowest speed generally used is 10 Mbps, i.e., in the Ethernet environment. The need for more bandwidth alone, however, is not enough to justify a new technology. Time division multiplexing (TDM) effectively scales up to SONET speeds of 155 Mbps. The problem with TDM is that it cannot provide true bandwidth-on-demand. New applications that are emerging present traffic to the network as large bursts of bits followed by lengthy interburst gaps.

ATM, when implemented properly, is able to make bandwidth available to carry the burst without disrupting other users. It is also able to make the bandwidth available to other users during the interburst period, thereby maintaining the cost-efficiency while carrying the applications in near real time.

In designing networks that use ATM technology, four factors require consideration: 1) complexity—complexity must appear to go away; networks should be kept as simple as possible; 2) economics—recurring bandwidth and operations costs must be contained; 3) transmission delay—the time it takes traffic to travel from origin to destination must be short; and 4) user demand—characteristics of the network must be appropriate to the application; that means information transfer may be required by the application to occur in near real time.

ATM combines the strengths of traditional packet switching—bandwidth efficiency—with those of circuit switching—high throughput, low delay, and transparency. Application traffic (voice, data, video, and image) is encapsulated in 53-byte cells for transport across the network. In contrast to traditional packet switching, no error processing occurs at the ATM layer, but is handled by the higher protocols in the attached DTE equipment. Therefore, ATM cells can be switched in hardware in gigabit speed with low delays. Because of the low latency and high throughput capabilities, ATM is the ideal technology to support these applications over the corporate network. It can support isochronous traffic, like voice and video, as well as bursty data, like local area internetworking, and traditional data, like SNA and X.25. The scalability of ATM makes it an attractive alternative for today's shared-media local area networks (LANs).

Since only meaningful information, such as active speech or payload data, is encapsulated in ATM cells for transfer across the network, bandwidth resources are used efficiently. By not wasting bandwidth resources for idle flags and silence periods during conversation, networks can be designed to make better use of available wide area facilities. ATM networks can be designed for least cost, while maintaining the quality of service (QoS) requirements of a wide variety of applications.

The challenges that must be overcome to attain seamless network vision are substantial. First, there are differences surrounding ATM deployment in the local versus wide area networks. These result in varying implementations in local area network and wide area network products that must interoperate to provide total network solutions. Second, there is the requirement for multi-vendor interoperability. Third, there are economic aspects that must be considered when migrating to the seamless ATM network.

Most of the focus in the local area network arena today has been put on pure data traffic. Voice and video are typically handled by specific communications equipment, completely separate from the local area network. Although multimedia is seen as one of the drivers of ATM to the desktop, current ATM LAN implementations are directed to the support of LAN data traffic only. On the other hand, a wide variety of traffic type traditionally has been supported over the wide area. To effectively integrate these traffic types with their specific performance criteria, ATM equipment must include sophisticated queuing, congestion, and routing algorithms.

The seamless network providing desktop-to-desktop multimedia networking is an exceedingly attractive solution that meets the high performance and flexibility required by future enterprise environments. To date, however, no method, system, or architecture having both an economically practical price and the desired level of performance exists that provides ATM network capabilities in the desktop environment.

Consequently, there is the need for a system that provides ATM network capabilities in the desktop environment.

There is a need for an ATM method and system that satisfactorily addresses the important considerations of local area and wide area network interoperability, multi-vendor interoperability, and economy in manufacture and implementation.

There is, in essence, the need for a method and system that satisfactorily addresses requirements in terms of both price and performance in bringing ATM to the desktop.

SUMMARY OF THE INVENTION

Accordingly, the present invention provides an asynchronous transfer mode (ATM) adapter for desktop applications that overcomes or substantially reduces limitations that exist in the ATM network environment.

According to one aspect of the invention there is provided an ATM adapter for desktop applications that includes an adapter for interfacing an ATM network. The adapter includes an ATM application specific integrated circuit (ASIC). The ATM ASIC may interface with a data bus such as an SBus using a host interface circuit. The host interface circuit includes a bus interface, a direct memory access or DMA controller and a slave access controller. The DMA controller controls DMA operations within the ATM ASIC and associates with a RAM interface arbiter. The slave access controller controls operation of both an interrupt circuit that goes to the SBus and a statistics circuit. The RAM interface arbiter arbitrates communication between the DMA controller, the slave access control circuit, a segmentation engine, and a reassembly engine. The RAM interface arbiter communicates with the RAM bus to a RAM associated with an adapter. The segmentation engine segments data into ATM format for transfer through a physical interface circuit. The physical interface circuit also receives formatted ATM information and sends that information to the reassembly engine. The reassembly engine reassembles the ATM data and transmits it through the RAM interface/arbiter circuit to the RAM bus. From the RAM bus, data may pass again through the RAM interface/arbiter to the DMA controller and onto the SBus through the host bus interface.

The present invention provides numerous technical advantages including the ability to communicate at the desktop level with an ATM network both economically and with a high degree of performance efficiency and quality of service. The present invention solves numerous problems associated with operating in a local area network using ATM formats and protocols.

More particular technical advantages that the present invention provides relate to ATM aspects of the ATM ASIC. For example, the ATM ASIC provides AAL5 conformance for the common part convergence sublayer, as well as desired segmentation and reassembly aspects. The ATM ASIC provides operation and maintenance cell support, simultaneous operation of eight segmentation channels and 1024 reassembly operations. Support for ten bits of virtual channel identifier and zero bits of virtual path identifier is also provided by the ATM ASIC of the present invention. In addition, peak cell rate traffic shaping support is a particularly attractive technical advantage or feature of the present invention. The present invention furthermore provides support for non-AAL5 traffic while providing status and error reporting capabilities. These and other technical advantages and features of the present invention will be apparent upon the review of the following detailed description together with the associated FIGURES.

BRIEF DESCRIPTION OF THE DRAWINGS

The invention and its modes of use and advantages are best understood by reference to the following description of illustrative embodiments when read in conjunction with the accompanying drawings, wherein:

FIG. 2 illustrates conceptually the operation of a local area network that provides ATM communication to the desktop;

FIG. 3 provides a block diagram of the application specific integrated circuit of the present embodiment that forms part of the ATM adapter for the present embodiment of the invention;

FIG. 4 provides a table indicating the mode control register bit positions of the present embodiment;

FIGS. 5 through 18 include in detail the register bits, types, defaults, names, and descriptions for the present embodiment of the invention;

FIG. 24 provides a table detailing absolute minimum and maximum ratings for the present embodiment of the invention;

FIG. 25 is a table that provides recommended operating conditions for the present embodiment;

FIG. 26 provides access, read, and write time ranges for the present embodiment of the invention;

FIG. 32 provides a table describing the segmentation control block field contents and functions in the present embodiment;

FIG. 34 is a table describing the DMA transmit queue field pointers to the next wright area and the current read area of the DMA transmit queue for the present embodiment;

FIG. 35 illustrates in block diagram form the peak cell rate circuit of the present embodiment;

FIG. 36 includes a table of the peak cell rate values for the present embodiment;

FIG. 37 includes a table that lists the possible size and location parameter values for the present embodiment;

FIGS. 41 and 42 show, respectively, the reassembly buffers for AAL5 and non-AAL5 transfer modes;

FIG. 43 provides a Service List format for the present embodiment;

FIG. 44 includes a table of the pointers to the Service List of the present embodiment;

FIG. 45 depicts the DMA receive queue format for the reassembly operations of the present embodiment;

FIG. 46 provides a table describing the DMA receive queue pointers for the present embodiment;

FIGS. 48 through 51 provide host interface pin descriptions for the present embodiment of the invention.

DETAILED DESCRIPTION OF THE INVENTION

The illustrative embodiments of the present invention are best understood by referring to the FIGURES wherein like numerals are used for like and corresponding parts of the various components.

Figure 1:
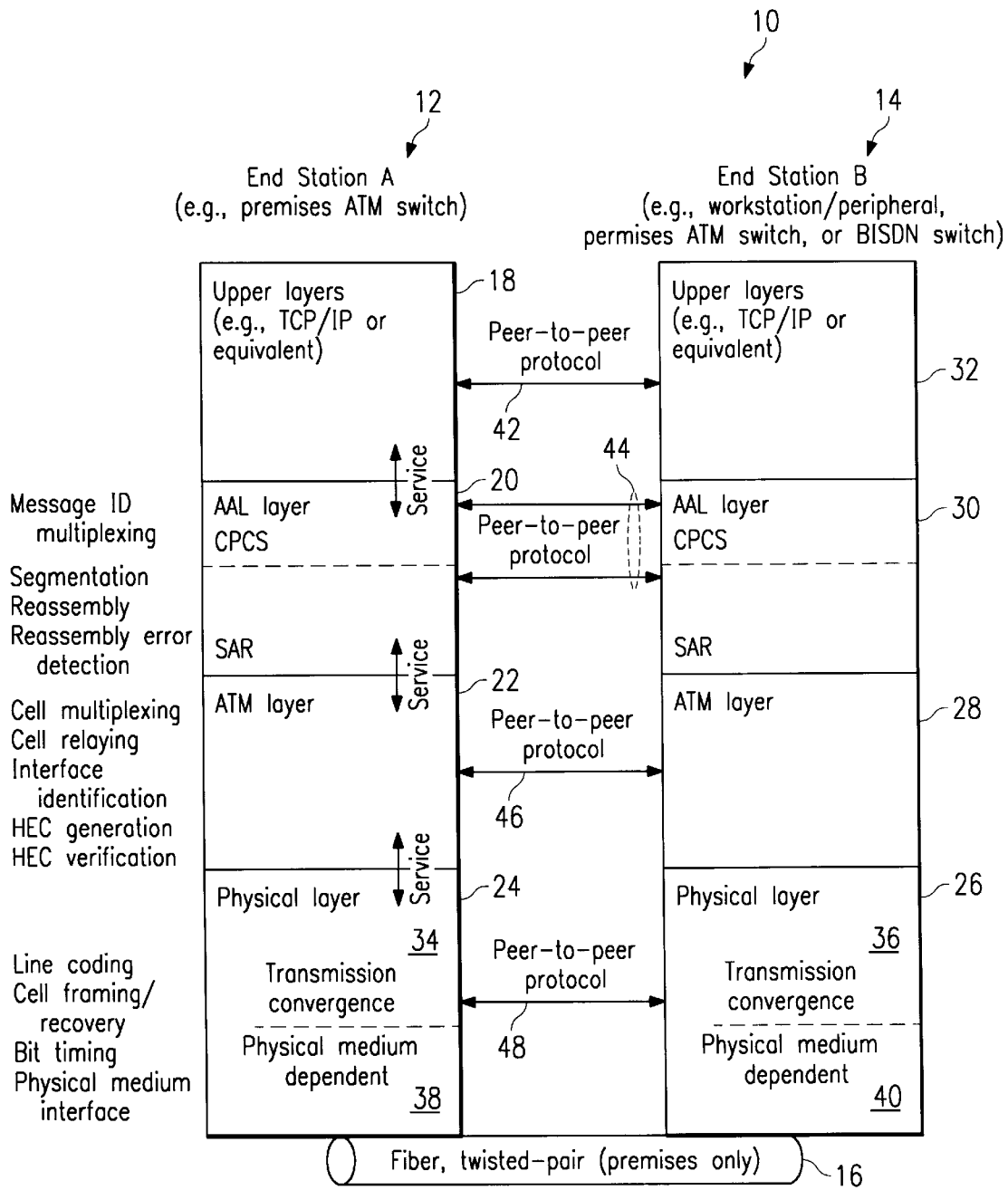
FIG. 1 provides an overview of the ATM communication process together with the protocols that operate at various ATM protocol layers of communication between two end stations.
Figure 19:
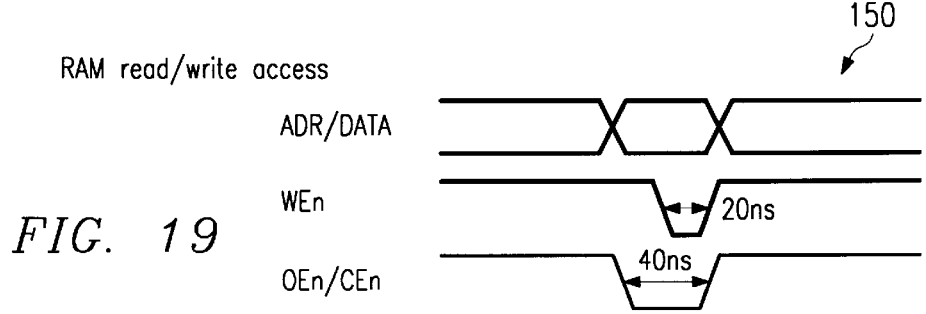
FIGS. 19 through 23 provide timing diagrams for the RAM, PHY layer, and EEPROM of the present embodiment.

FIG. 1 provides an overview of the ATM communication process together with the functions that take place at various layers of communication between communicating end stations. Within the framework of ATM protocol layers 10, ATM protocols provide communication paths between end station A and end station B. End station A may be, for example, an end station, while end station B may be, for example, a workstation or peripheral, an end station or a B-ISDN switch. Protocol diagram 10, therefore, represents the various protocols that exist when end station A communicates through ATM protocol layers 12 to end station B which uses ATM protocol layers 14. Fibre or twisted pair connection 16 represents the physical connection between end station A and end station B. ATM protocol layers 12 for end station A include upper layers 18 through which service occurs between ATM adaptation layer (AAL) layer 20. AAL layer 20 services and receives service from ATM layer 22. ATM layer 22 services and receives service from physical layer 24. Fibre or twisted pair connection 16 connects physical layer 24 for end station A with physical layer 26 for end station B. For end station B, physical layer 26 services and receives service from ATM layer 28. ATM layer 28 services and receives service from AAL layer 30. Upper layers 32 service and receives service from AAL layer 30.

For the layers of FIG. 1, which includes a transfer control protocol/internet protocol (TCP/IP) or equivalent services in upper layers 18. AAL layers 20 and 30 provide protocols for segmentation, reassembly, reassembly error detection, and message identification multiplexing. ATM layers 20 and 28 include protocols for cell multiplexing, cell relaying, and interface identification. Physical layers 22 and 28 include transfer convergence layers 34 and 36, as well as physical medium dependent layers 38 and 40, respectively. At physical layers 22 and 28, header error control (HEC) generation, HEC verification, and cell framing recovery protocols operate at the physical layers 22 and 28. At physical medium dependent sublayers 38 and 40, bit timing and physical medium interface protocols appear.

At each of the layers between end station A and end station B in FIG. 1, protocols also exist to permit peer-to-peer addressing. For example, bidirectional arrow 42 indicates peer-to-peer protocols that exist between upper layers 18 and 32. Bidirectional arrow 44 indicates protocols that exist for information exchanged between AAL layer 20 and AAL layer 30. Bidirectional arrow 46 depicts peer-to-peer protocols that exist for information exchanged in control between ATM layer 22 and ATM layer 28, and bidirectional arrow 48 indicates peer-to-peer protocols for physical layer 22 and physical layer 28 information exchanged in control.

With ATM, three planes exist: (1) the user plane, (2) the control plane, and (3) the management plane. In the user plane transfer of end-user information occurs. The user plane consists of physical layer 22 and ATM layer 22. For each end-user application, the ATM protocol model includes AAL layer 20 and higher layers as necessary. The control plane provides for the transfer of information to support connection establishment and control functions necessary for providing switched services. The control plane shares ATM layer 22 and physical layer 22 protocols with the user plane. The control plane also uses AAL protocols and higher layer signalling protocols. The management plane provides operations and management (OAM) functions and the capability to exchange information between the user plane and the control plane. The management plane includes management functions for layer management and plane management. The layer of management functions of the management plane include detection of failures in protocol abnormalities. The management plane functions include management and coordination functions related to the complete system.

Physical layer 24 provides access to the fibre or twisted pair 16 for the transport of ATM cells between end station A and end station B. It includes methods for mapping cells into transfer conversion sublayers 34 and 36 as well as methods dependent on the physical medium that exists within physical medium dependent sublayers 38 and 40. ATM layer 22 and 28 make possible to transport a cell between end-user locations.

To more completely understand the services that occur at each of the above-described layers, reference is here made to known ATM documents and specifications, including ITU-T recommendation X.210, *Open Systems Interconnection, Layer Service Deformation Convention*, Geneva, Switzerland, 1989; ITU-T Recommendation I.361, *B-ISDN ATM Layer Specification*, Geneva, Switzerland, June 1992; T1S1.5/92-410, *Broadband ISDN-ATM Layer Functionality Specification*, August 1992; ATM Forum, *ATM User-Network Interface Specification*, Version 3.0, August, 1993; The ATM Forum, *An ATM PHY Data path Interface*, Level 1-Version 1.22; SUN Microsystems: *SBus Specification B.O*, 1990; and ANSI T1. ATM-1993, *Broadband ISDN-ATM Layer Functionality Specification*, New York. All of the above references and standards are here expressly incorporated by reference. Moreover, and consistent with much of the terminology of the above references, TABLE 1 includes terms having general meanings that include, at a minimum, those specified.

TABLE 1

| | |
|---|---|
| AAL | A layer that adapts higher-layer user protocols (e.g., TCP/IP, APPN) to the ATM protocol (layer). |
| AAL connection | An association established by the AAL between two or more next higher layer entities. |
| Asynchronous transfer mode (ATM) | A transfer mode in which the information is organized into cells. It is asynchronous in the sense that the recurrence of cell, containing information from an individual user is not necessarily periodic. |
| ATM Layer connection | An association established by the ATM Layer to support communication between two or more ATM service users (i.e., between two or more next higher layer entities or |

TABLE 1-continued

| | |
|---|---|
| | between two or more ATM management entities). The communication over an ATM Layer connection may be either bidirectional or unidirectional. When it is bidirectional, two VCCs are used. When it is unidirectional, only one VCC is used. |
| ATM peer-to-peer connection | A virtual channel connection (VCC) or a virtual path connection (VPC). |
| ATM traffic descriptor | A generic list of traffic parameters that can be used to capture the intrinsic traffic characteristics of a requested ATM connection. |
| ATM user-user connection | An association established by the ATM Layer to support communication between two or more ATM service users [i.e., between two or more next-higher-layer entities or between two or more ATM management (ATM) entities]. The communication over an ATM Layer connection may be either bidirectional or unidirectional. When it is bidirectional, two VCCs are used. When it is unidirectional, only one VCC is used. |
| Broadband | A service or system requiring transfer channels capable of supporting rates greater than the Integrated Service Digital Network (ISDN) primary rate. |
| Cell | ATM Layer protocol data unit. |
| Cell header | ATM Layer protocol control information. |
| Connection | The concatenation of ATM Layer links in order to provide an end-to-end information transfer capability to access points. |
| Header | Protocol control information located at the beginning of a protocol data unit. |
| Operation and maintenance (OAM) cell | A cell that contains ATM Layer Management (LM) information. It does not form part of the upper-layer information transfer. |
| Physical Layer (PHY) connection | An association established by the PHY between two or more ATM, entities. A PHY connection consists of the concatenation of PHY links in order to provide an end-to-end transfer capability to PHY SAPs. |
| Protocol | A set of rules and formats (semantic and syntactic) that determines the communication behavior of layer entities in the performance of the layer functions. |
| Protocol control information (PCI) | Information exchanged between corresponding entities, using a lower-layer connection, to coordinate their joint operation. |
| Protocol data unit (PDU) | A unit of data specified in a layer protocol and consisting of protocol control information and layer user data. |
| Relaying | A function of a layer by means of which a layer entity receives data from a corresponding entity and transmits them to another corresponding entity. |
| Service access point (SAP) | The point at which an entity of a layer provides services to its layer management entity or to an entity of the next higher layer. |

TABLE 1-continued

| | |
|---|---|
| Service data unit (SDU) | A unit of interface information whose identity is preserved from one end of a layer connection to the other. |
| Sublayer | A logical subdivision of a layer. |
| Switched connection | A connection established via signalling. |
| Traffic parameter | A parameter for specifying a particular traffic aspect of a connection. |
| Trailer | Protocol control information located at the end of a PDU. |
| Transit delay | The time difference between the instant at which the first bit of a PDU crosses one designated boundary and the instant at which the last bit of the same PDU crosses a second designated boundary. |
| Virtual channel (VC) | A communication channel that provides for the sequential unidirectional transport of ATM cells. |
| Virtual path (VP) | A unidirectional logical association or bundle of VCs. |

FIG. 2 illustrates conceptually the operation of a local area network that provides ATM communication to the desktop to illustrate the portion of a communications network that the present invention addresses. The present invention makes possible a highly efficient local area network that includes, as its basis, information exchange and control for ATM connections. In FIG. 2, customer site 50 includes local ATM-based network 52 having ATM switch 54, ATM switch 56, ATM switch 58, and ATM switch 60.

In the example, ATM switch 54 may connect with ATM switch 56 through interface 62 and ATM switch 60 through interface 64. Similarly, ATM switch 58 may connect to ATM switch 56 through interface 66 and to ATM switch 60 through interface 68. Connected to local ATM-based network 52 may be, for example, user end station 70 to ATM switch 54, user end station 72 to ATM switch 56, and user end station 74 to ATM switch 56. ATM switch 56 may also, for example, connect to a host 76 which may be a super computer or other end station as well as to memory end station 78. ATM switch 58 may connect to user end station 80 as well as to a peripheral 82 which may be, for example, a printer or other end station.

In local ATM-based network 52, ATM switch 60 may also connect to user end station 84, to router 86 (which may further connect to non-ATM wide area network), and to an ATM/B-ISDN public wide area network 88 outside of customer site 50. The topology that the local ATM environment of customer site 50 depicts, therefore, includes point-to-point links such as links 90 between ATM switch 54 and end station 70. In addition, local ATM environment 50 includes interfaces between ATM switches such as link 62 between ATM switch 54 and ATM switch 56. Even further, link 92 between ATM switch 60 and ATM/B-ISDN public wide area network 88 depicts an interface between the local environment and the wide area network environment. Within this environment, the present invention makes possible ATM-based information transfer and exchange possible from desktop-to-desktop.

The present embodiment provides ATM capabilities to the desktop through a 155.52 Mbps adapter for any SBus platform. The present embodiment interfaces a 155.52 Mbps SBus adapter for SPARCstations and SPARCservers such as those manufactured by Sun Microsystems, Inc. and other vendors for a multimode fibre or Category 5 unshielded twisted-pair interface at 155.52 Mbps. Other embodiments of the present invention may adapt ATM technology to a Peripheral Component Interconnect bus, such as that used in Intel Corp. Pentium and IBM PowerPC computers and the GIO bus by Silicon Graphics, Inc. The adapter of the present embodiment may also support midrange speed ATM at 52 Mbps over Category 3 unshielded twisted-pair wire. The present invention, therefore, has application in a wide array of adapters for a variety of speeds, host buses, operating systems and physical layer interfaces that will be compatible with different types of ATM switches. The present embodiment also includes a range of application program interfaces to permit building desktop applications that use ATM for management and call connection operations.

An important aspect of the present embodiment is the functionality of an ATM application specific integrated circuit (ASIC) that provides improved performance in the ATM environment at a minimum cost. The ATM ASIC includes numerous attractive features including (1) AAL5 Conformance for Common Part Convergence Sublayer and Segmentation and Reassembly; (2) OAM cell support; (3) simultaneous operation of eight segmentations and 1024 reassemblies; (4) support for 10 bits of VCI address space, 0 bits of VPI; (5) peak cell rate traffic shaping support; (6) insertion of ATM cell header fields; (7) reassembly buffer allocation and host notification; (8) support for non AAL5 traffic; (9) status and error reporting; (10) UTOPIA interface; and (11) a direct SBus Interface having a bus master DMA and slave interface.

FIG. 3 shows a block diagram of the ATM application specific integrated circuit (ATM ASIC) 100 that the present embodiment uses to provide ATM services to the desktop. Referring to FIG. 3, ATM ASIC 100 communicates with the SBus as bidirectional arrow 102 indicates between the SBus and bus interface circuit 104 of host interface 106. Host interface 106 also includes DMA controller 108 and slave access control 110. DMA controller 108 communicates with SBus interface 104 as does slave access control circuit 110. From host interface 106, DMA controller 108 communicates with RAM interface/arbiter 112. Slave access control circuit 110 associates with interrupt circuit 114 and with statistics circuit 116. Interrupt circuit 114 further associates with the SBus host, as arrow 118 indicates. Statistics block 116 maintains statistics regarding trashed cells, as described below. RAM interface/arbiter circuit 112 communicates with the RAM bus as bidirectional arrow 120 depicts. In addition, RAM interface/arbiter circuit 112 interfaces and arbitrates signals among DMA controller 108, slave access control circuit 110, segmentation engine 122, and reassembly engine 124. Clock generator circuit 126 receives a clock input, as arrow 128 illustrates. From segmentation engine 122, output goes to physical (PHY) interface circuit 130. PHY interface circuit 130 provides communication with the physical layer through communication path 132.

In ATM ASIC 100, all circuits except for bus interface circuit 104 run at a clock speed of 25 MHz which is supplied to ATM ASIC 100 from an external oscillator on the adapter board through clock generator circuit 126. This clock is used to time circuits internal to ATM ASIC 100 as well as PHY interface circuit 130 and the RAM interface/arbiter circuit 112. Bus interface circuit 104 operates at whatever speed is supplied from SBus interface 102 (e.g., 16–25 MHz, see, e.g., SUN Microsystems: "SBus Specification B.0.", 1990). The plesiochronous interface is between bus interface circuit 104 and DMA controller 108 and slave access control circuit 110. The design of ATM ASIC 100 is such that it functions properly at all possible bus speeds and loses no data due to plesiochronous complications such as metastability.

PHY interface circuit 130 interfaces the internal cell flows to the external physical layer device. Three modes of operation may take place in PHY interface circuit 130 of the present embodiment. They include: (1) Universal Test and Operations Phi Interface for ATM Universal Test and Operations Physical Interface for ATM (UTOPIA) mode (See, The ATM Forum: *An ATM PHY Data Path Interface*, Level 1—Version 1.22); (2) non-pipelined read UTOPIA mode; and (3) asynchronous interface mode that is compatible with the PMC-Sierra SUNI® chip, Part Number PM5345. (See Document Number PMC-930305P1, published by PMCCL, Vancouver, British Columbia.)

The mode of PHY interface circuit 130 is controlled by a mode control register. The operating mode determines the function of the handshake signals at PHY interface circuit 130. FIG. 4 provides a table indicating the mode control register bit format of the present embodiment. The mode control register is loaded with the value on the DATA bus during board reset, while the RESET signal is asserted into the board. External pull-up and pull-down resistors are required on the DATA bus to pull the different control bits to the required configuration state.

All bits of the register are defined in the table of FIG. 4. Note that the pull-up and pull-down on the eight least significant bits may be placed on the daughter board for the adapter, if applicable. This can be used to automatically configure ATM ASIC 100 for the different daughter board interfaces supported. Note that, in the present embodiment, there is no actual daughter board. There are, however, bits that are used as if there were such an actual daughter board. Because it is more economical to do so, the present embodiment uses certain of the bits in FIG. 4 as though there were a daughter board. The FIG. 4 bits relate to the register descriptions that appear in FIGS. 5 through 18. These register descriptions detail the register contents and functions for registers of the present embodiment.

FIG. 5 describes the contents for PHY interface circuit 130 reset/identifier register 0×00. FIG. 6 describes the contents for the interrupt status acknowledge register 0×01 and interrupt status register 0×02. The difference between the interrupt status register 0×02 and the interrupt status acknowledge register 0×01 is that the interrupt is cleared when reading the interrupt status acknowledge register except for the SUNI_INT and STAT_OVFL bits that must be acknowledged by reading the SUNI® and reading the statistics register, respectively. When reading interrupt status register 0×01, the interrupts are not acknowledged.

FIG. 7 describes the contents of interrupt enable register 0×03. FIG. 8 details the master control/status register 0×04 of ATM ASIC 100. The statistic register 0×05 description appears in FIG. 9, while FIG. 10 contains a description of the ServWrite Register 0×06. In FIGS. 11, 12, 13, 14, and 15 register descriptions are defined for DMA address register 0×07, DMA write register 0×08, and DMA read register 0×09, DMA write register 0×0A, and DMA read register 0×0B, respectively. FIGS. 16, 17, and 18, respectively, describe the contents of transmit place register (0×10+ (4*channel)), transmit read pointer register (0×11+ (4*channel)), and transmit descriptor start registers (0×12+ (4*channel)). In FIGS. 9 through 18, references to Midway are to be taken as references to ATM ASIC 100 of the present embodiment.

Returning to FIG. 3, in the present embodiment, PHY interface circuit 130 is eight bits wide with the necessary controls and clocks for this level of operation. Segmentation engine 122 generates an extra byte as byte number 5 as a place holder for the HEC byte of every cell. PHY interface circuit 130 strips away the HEC byte of every cell when receiving from the physical interface 132. In the receive direction, PHY interface circuit 130 contains a one-byte FIFO so that full speed operation is possible in the UTOPIA mode.

When the RX-ENABLE control bit (FIG. 8) is not set, PHY interface circuit 130 is disabled from reading any new bytes from the physical layer chip. When the TX_ENABLE control bit (see FIG. 8), is not set, this block is disabled from writing any new bytes to the physical layer chip.

One clock input pin is provided for connecting an external crystal oscillator as the clock source.

Figure 20:
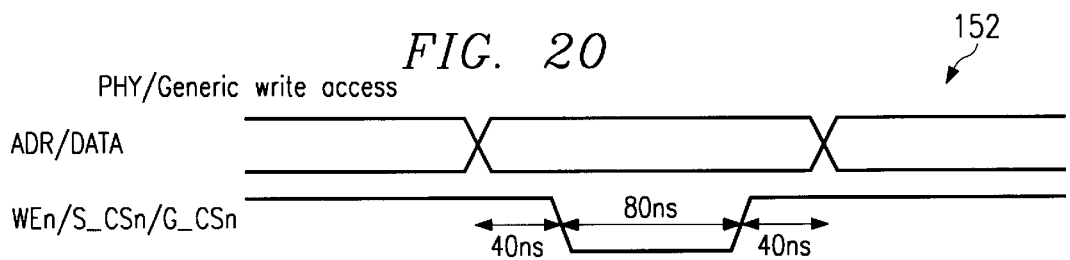
Figure 21:
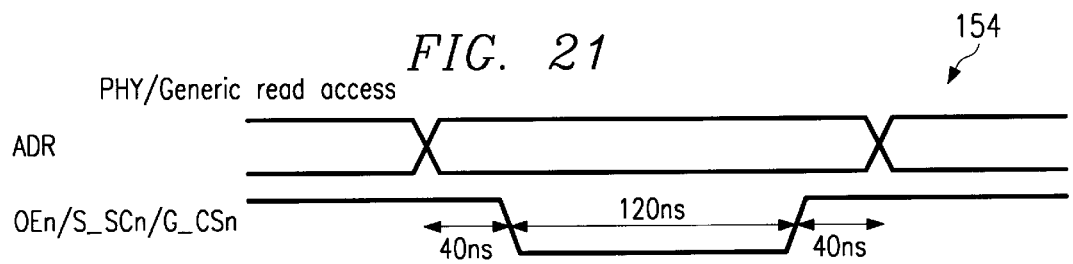
Figure 22:
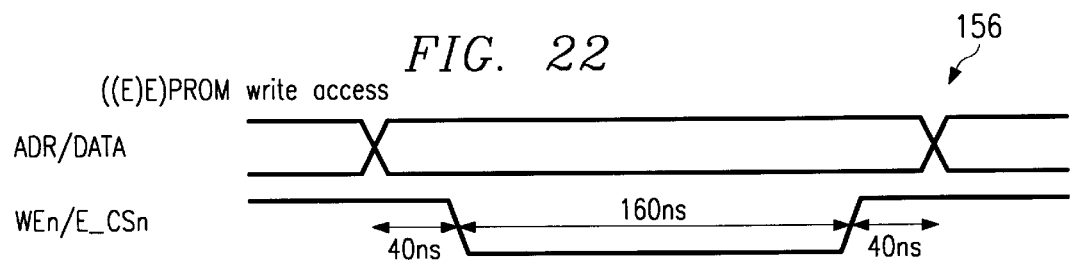
Figure 23:
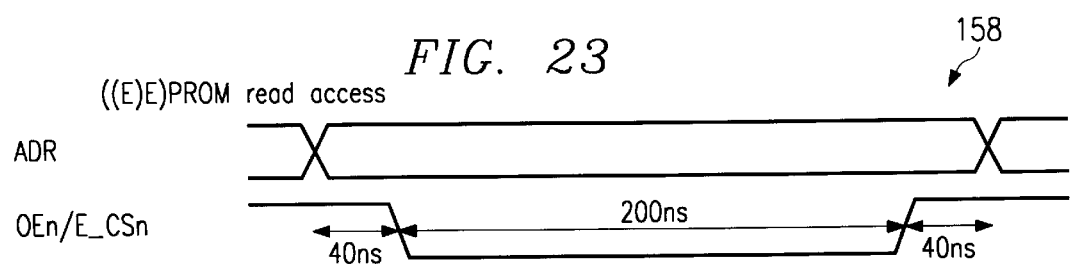

RAM interface/arbiter circuit 112 interfaces to the adapter SRAM external to ATM ASIC 100. RAM interface/arbiter circuit 112 includes the RAM bus 120 has 32 bidirectional data pins, 19 output address pins, and some output enable and chip select signals. These are detailed in FIGS. 48 through 51. The maximum addressable RAM size is 512K× 32 bits (corresponding to 2 Mbytes). RAM interface/arbiter circuit 112 controls access to the individual bytes in the 32 bit RAM based on type of RAM access. The RAM is accessed at full 25 MHz speed (or 40 ns) through RAM bus interface 120. For a more complete understanding of the access times of the present embodiment, reference is made to FIGS. 19 through 23 which provide timing diagrams for the RAM, PHY controlling space, and EEPROM to show the intended timing relations for access to these components. In particular, for RAM interface/arbiter circuit 112, timing diagrams 150 depict the read/write access times. FIG. 20 shows the control access to PHY interface circuit through the RAM interface circuit 122. FIG. 21 shows the control access timing diagrams 154. Timing diagrams 156 depict the EEPROM write access times for the EEPROM. Timing diagrams 158 depict the read access times for the EEPROM. Although the timing values below can not be guaranteed under worst case conditions and under various loads, the present embodiment successfully approximates these times.

To more completely understand the operating characteristics of the present embodiment, reference is now made to FIGS. 24 and 25 which provide tables detailing absolute maximum ratings and operating conditions, respectively, for the present embodiment. Stresses above those listed may cause damage to the device. These are stress ratings only, and functional operation of this device under these conditions is not implied. Exposure to maximum rating conditions for extended periods may affect end station reliability.

FIG. 26 provides access, read, and write time ranges for the present embodiment of the invention. In addition, this block provides the interface to the other external devices on the RAM bus, such as the microprocessor interface chip, the EEPROM, and any on board discrete control registers etc. When addressing these devices, RAM interface/arbiter circuit 112 will slow down the cycle to match the slowest foreseen device, which in the present embodiment is likely to be the SUNI®. The access cycles to the different devices have different timing diagrams as specified in FIGS. 19 through 23, above.

Figure 27:
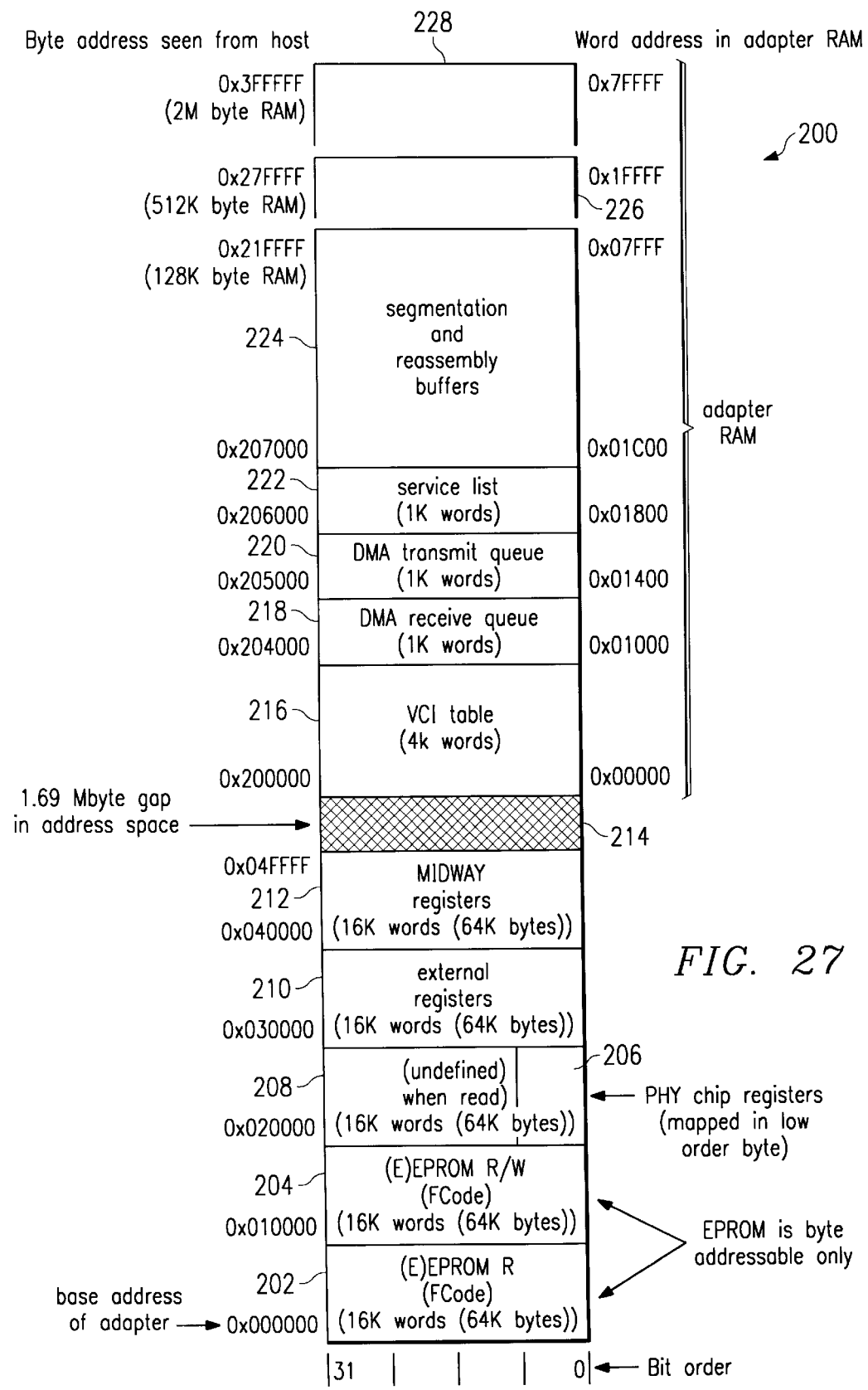
FIG. 27 includes a memory map that illustrates conceptually the allocation of registers in the present embodiment of the invention.

FIG. 27 is a memory map 200 that illustrates the allocation of registers in the present embodiment of the invention. Note that in FIG. 27, as in all FIGURES herein that illustrate bit orders, the most significant bit is positioned to the left and the least significant bit to the right, where bit 0 is always the least significant bit.

Turning briefly to FIG. 27, there appears memory map 200 for the allocation of registers in the adapter RAM of the adapter of the present embodiment. In particular, memory map 200 shows on the left hand side the byte address as seen from the host. On the right hand side appears the word address in the adapter RAM. From the left to right is the bit order 31 through 0. Thus, beginning at address 0×0000000 is the EEPROM read FCode which consumes 16K words or 64 Kbytes, as block 202 indicates. Block 204 at byte address ×010000 appears EEPROM read/write FCode which also consumes 16K words or 64 Kbytes, as block 204 indicates. Blocks 202 and 204 are only byte addressable in the EEPROM from the host. The next blocks 206 and 208 indicate the PHY interface 130 chip registers. Thus, block 206 beginning at byte address 0×020000 for the first 8 bits 7 through 0, which provide the valid information for the PHY chip registers. Bits 8 through 31 are undefined when read from block 208. Blocks 206 and 208 consume 64K bytes. At byte address 0×030000 appears block 210 for external registers in the amount of 16 words. ATM ASIC 100 registers block 212 begins at byte address 0×040000 and consumes 16K words. At byte address 0×04FFFF begins a 1.69 megabyte gap 214 in address space. Thereafter, the adapter RAM begins. In memory map 200, the adapter RAM includes the memory bounded by word addresses 0×00000 and 0×7FFFF. The adapter RAM includes memory from word address 0×20000 to 0×3FFFFF. At this address, 4K words of VCI table memory is allocated as block 216 indicates. At byte address 0×204000 and adapter word address 0×01000 begins 1K words of DMA received queue memory as block 218 depicts. Block 220 beginning at byte address 0×205000 and adapter word address 0×01400 appears DMA transmit queue memory in the amount of 1K words. Next, Service List block 222 allocates 1K words beginning at byte address 0×202000 and adapter word address 0×01C00.

At byte address 0×207000 and word address 0×01C00 begins segmentation and reassembly buffers memory block 224. Segmentation and reassembly buffers block 224 continues until byte address 0×21FFFF for word address 0×07FFF at which point unassigned block 226 begins. Block 226 continues until byte address 0×27FFFF (word address 0×1FFFF) at which point unassigned block 228 is begins and continues until the 2 megabyte RAM final byte address of 0×3FFFFF and word address of 0×7FFFF. This concludes the allocation of memory for memory map 200.

The present embodiment includes an EEPROM which is mapped twice. In one address space the EEPROM is mapped as read only and in another it is mapped as read/write. The two least significant address pins on the EEPROM connect directly to designated SBus lines 102, the rest of the EEPROM address lines are connected to the RAM bus 120 address lines.

Returning again to FIG. 3, during reset RAM interface/arbiter circuit 112 will latch the state on the RAM data bus into the internal mode control register. The mode control register controls the mode of PHY interface circuit 130 and provides identifier codes for the card and the daughter card of the ATM adapter of the present embodiment. All that is required on the board is pull-up and pull-down resistors on the adequate data lines (some of these pull-up/downs placed on the daughter card (if applicable)), see FIG. 4 and accompanying text, above.

RAM interface/arbiter circuit 112 also handles RAM arbitration between the four contending ATM ASIC 100 circuits that require access to the RAM. These include reassembly engine 124, segmentation engine 122, slave access control circuit 110, and DMA controller 108. In the present embodiment, the highest priority is given to reassembly engine 124, then segmentation engine 122, then slave access control circuit 110, and lowest to DMA controller 110. Note that all circuits are guaranteed to get a share of the bus bandwidth even in congestion situations, because the bus bandwidth of 800 Mbps is much higher than the required bandwidth of reassembly engine 124 of 155 Mbps and segmentation of 155 Mbps engine 112 put together.

Host interface block 106 of the present embodiment is targeted for the SBus interface standard, from SUN Microsystems, Inc. As stated above, however, other embodiments of the present invention may accommodate a Peripheral Component Interconnect bus, such as that used in Intel Corp. Pentium and IBM PowerPC computers, as well as the GIO bus by Silicon Graphics, Inc., and EISA. The overall function of the DMA transfers is described further below in connection with segmentation and reassembly operations. ATM ASIC 100 will interface directly to the SBus with no external circuitry through bus 102 to support the full 16–25 MHz bus speed range. With the present embodiment, there are two types of access: (1) Slave access, and (2) DMA.

Host interface circuit 106 allows access to the adapter memory and other devices on the RAM bus as well as all the internal ATM ASIC 100 registers through the slave access control circuit 110 with addresses according to the memory map of FIG. 27.

In host interface circuit 106, when accessing the EEPROM region, bytes are supported. In this case, ATM ASIC 100 will return a byte acknowledgment that causes the host to do bus sizing, if required. ATM ASIC 100 will return error acknowledgments if accessed by burst data requests. When accessing anything else, only 32-bit word accesses are supported. ATM ASIC 100 will return error acknowledgments if accessed by burst, byte, or half-word size data requests. If accessed by a word request, ATM ASIC 100 will return word acknowledgments. The address space will wrap in the slot address space.

In operation, ATM ASIC 100 will never return a rerun acknowledgment or assert the LERRn signal. ATM ASIC 100 will insert wait states when required at read and write operations that cannot be completed in one cycle. ATM ASIC 100 supports post writing on write accesses which will potentially eliminate wait states on writes. Post writing is not supported when writing to the EEPROM, because the post address bits connect directly to the EEPROM. Wait states will be inserted instead when writing.

ATM ASIC 100 acts as bus master when DMA transfers are to be performed. ATM ASIC 100 will assert the bus request signal, wait for the BGn bus grant, and then perform the DMA. If a rerun acknowledgment is received, ATM ASIC 100 will reissue the transfer. If any other acknowledgment except for word acknowledgment is received, ATM ASIC 100 will rerun the same cycle. If the rerun or any future cycle in this DMA transfer fails again, it will lock any further DMA operation by clearing the DMA ENABLE bit (FIG. 8) in the master control register. In both cases an DMA ERR ACK interrupt will be issued. The host can read the virtual address of the burst start address that caused the bus error in the DMA address register.

If the LERRn signal is asserted, ATM ASIC 100 will rerun the cycle if possible as if it were an error acknowledgment, as above. If not possible, ATM ASIC 100 will clear the DMA ENABLE, but not until after completing the next cycle. In any case, the DMA LERR ACK interrupt will be generated. The DMA ADDR register will contain either the address of the burst start address that caused the error, or the start address of the burst following the error.

If the DMA ENABLE bit is cleared by segmentation engine 122 due to a mismatch in the identifiers (i.e., the first four bits of the FIG. 30) from the mode control register, or if DMA ENABLE bit is cleared by DMA controller 108 due to a DMA overflow in the transmit direction, then host interface circuit 106 terminates the current bus transfer, if any, and suspends further DMA operation until the DMA ENABLE bit is set by the host.

The operation of the DMA transfer is different for the read and write DMA's. ATM ASIC 100 will change directions every time a DMA transfer is completed that had the End bit set in the DMA descriptor (see FIG. 33, below), but only if there is something to DMA in the other direction.

ATM ASIC 100 supports the following in a host to adapter transfer: byte, half-word, word, 2 word burst, 4 word burst, 8 word burst, and 16 word burst. The DMA descriptors (see FIGS. 29 and 33) must be setup so that transfer type and source address match. Otherwise, the transfer will wrap within the burst block. A special case is the Words-Maybe cycles that will issue a complete burst. However, part of the burst may be ignored in one direction by ATM ASIC 100. In the other direction, part of the burst will be ignored by the host.

The transferred data will be written to a byte aligner that accumulates bytes and half-words into 32 bit words. These will be written to a 16-word deep FIFO internal to DMA controller 108. In parallel with this, the FIFO will be emptied into the adapter RAM through RAM interface/arbiter circuit 112. This is true, except when doing 16-word bursts which will fill and empty the FIFO in a time multiplexed manner.

In an adapter-to-host transfer, ATM ASIC 100 supports the following transfer types: Word, 2 word burst, 4 word burst, 8 word burst, and 16 word burst. The DMA descriptors (FIGS. 29 and 33) must be setup so that transfer type and source address match. Otherwise, the transfer will wrap within the burst block. A special case is the Words-Maybe cycles that will issue a complete burst, but part of the burst will contain data that will be ignored.

Words from the adapter memory will be filled into the 16 word deep FIFO internal to DMA controller circuit 108. In parallel with this, the FIFO will be emptied on to the SBus 102 as the words are transferred, except when doing 16-word bursts which will fill and empty the FIFO in a time-multiplexed manner.

Statistics circuit 116 maintains two statistics counters of trashed cells: (1) the VCI trash counter, and (2) the overflow trash counter. The VCI trash counter is a counter that counts the number of received normal cells which are trashed because the VCI entry for the received VCI had the mode set to trash, or OAM cells which are trashed because the VCI entry for the received VCI had the PTI_mode set to trash. The overflow trash counter is a counter that counts the number of received cells which are trashed because there was insufficient room in the reassembly queue for them. This counter will be incremented for all received cells for which the VCI descriptor state is trashing. Both counters are 16 bits wide. If overflow occurs, the counters will stand on their maximum counts possible. Both counters are reset to zero when read by the host. If either or both counters exceed 32767 (i.e., if the most significant bit is set), then this causes the STAT_OVFL interrupt to be generated. The STAT_OVFL interrupt is acknowledged when the counters are read and thereby reset by the host.

Interrupt circuit 114 handles the interrupt generation to the host. When in the following sections, it is said that an interrupt is generated, it actually means that an interrupt is requested to interrupt circuit 114 block. Interrupt circuit 114 then provides filtering of the interrupts and the actual interrupt interface to the host.

There are two types of interrupt sources: (1) interrupts caused by an event in ATM ASIC 100, and (2) interrupts caused by an interrupt from the external source (the physical layer chip) tied to the S_INTn input pin. Two interrupt status registers are available for read access through slave access control circuit 110 interrupt status register and interrupt status acknowledge register. See, FIG. 6, above.

Each interrupt source can be enabled and disabled in the interrupt enable register (FIG. 7). If disabled it means that this interrupt source will not cause an interrupt to be generated to the host. Disabling an active interrupt source removes the asserted interrupt signal. That is, if no other active interrupts are enabled, the asserted interrupt signal is removed. Enabling an active interrupt source will assert the interrupt signal, if not already asserted by another active enabled source. A disabled interrupt will still show up, i.e., the bit will still be set, in the interrupt status register and the interrupt status acknowledge register, and the interrupt will still be acknowledged when reading the interrupt status acknowledge register.

In the present embodiment there is a timer that the host may set to disable interrupts for a length of 0.5 msec or about 1 msec. This permits disabling interrupts when there are numerous PDU's one immediately after another. Then, reading the service list will show that numerous reassembly operations have been completed. This makes it possible, therefore, for the DMA's to be set up for a large number of PDUs, rather than it being interrupted for every PDU. This increase both the speed and performance of the present embodiment. This is accomplished by writing to two configuration bits in the master control register. That is, the interrupt output will be disabled for the specified period starting from the time the control register is written. This mechanism can be used by the host to more precisely control the number and effect of interrupts.

There are seven possible interrupt lines on the SBus. The INT SELECT bits in the master control register determine which one of the interrupt pins will be used by ATM ASIC 100. INT SELECT can also be used to disable interrupts altogether.

Figure 28:
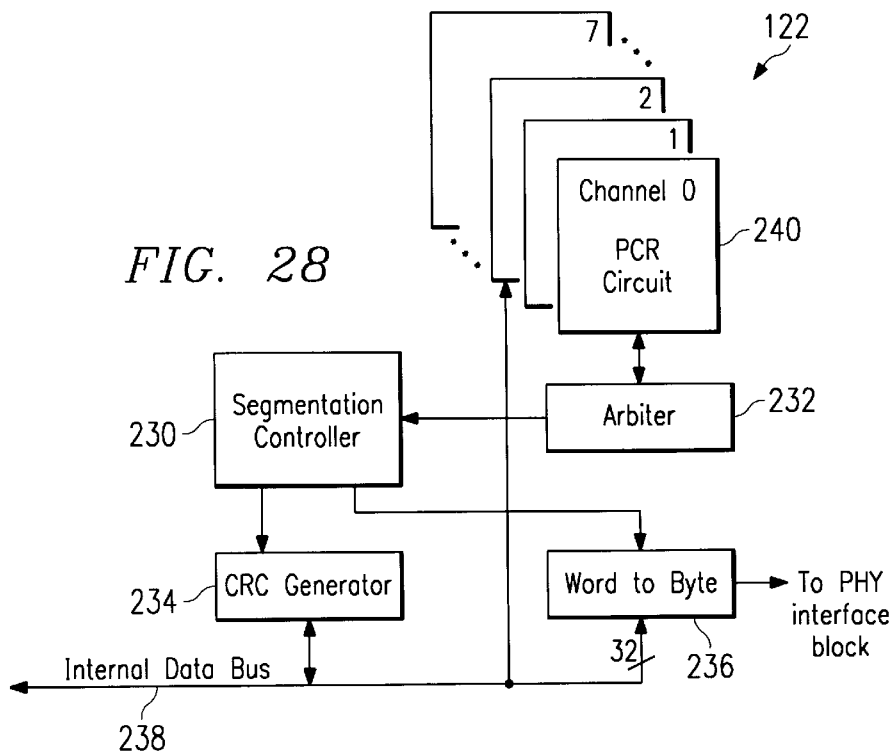
FIG. 28 provides a block diagram of the segmentation engine of the present embodiment.

FIG. 28 provides a block diagram of segmentation engine 122. In segmentation engine 122 appears segmentation controller 230 that receives input from arbiter circuit 232. Segmentation controller 230 provides input into Cyclic Redundancy Check or CRC generator 234 and word to byte circuit 236. CRC generator 234 and word to byte circuit 236 communicate with other internal circuitry of ATM ASIC 100 through internal data bus 238. Arbiter circuit 232 communicates with PRC circuit 240 which includes eight channels numbered 0 through 7. PRC circuit 240 also communicates with the internal data bus 238. As depicted in FIG. 28, segmentation engine 122 may serve eight simultaneous segmentation operations, one in each segmentation channel. Each channel can have a separate PCR rate. Channel 0 can be programmed to use the remaining available bandwidth. In this mode, channel 0 is referred to as the available bit rate channel.

ATM ASIC 100 can segment and transmit two types of traffic: AAL5 and non-AAL5. Non-AAL5 traffic is transparent to ATM ASIC 100 as no special processing is performed. Any of the eight channels can send non-AAL5 cells interleaved among AAL5 PDUs. This approach is used to transmit OAM cells as well. Non-AAL5 segmentation buffers always contain one cell only. For transmits, the ten least significant bits of VCI addressing are supported. The GFC, the VPI, and the six most significant bits of the VCI are fixed at zero.

Figure 29:
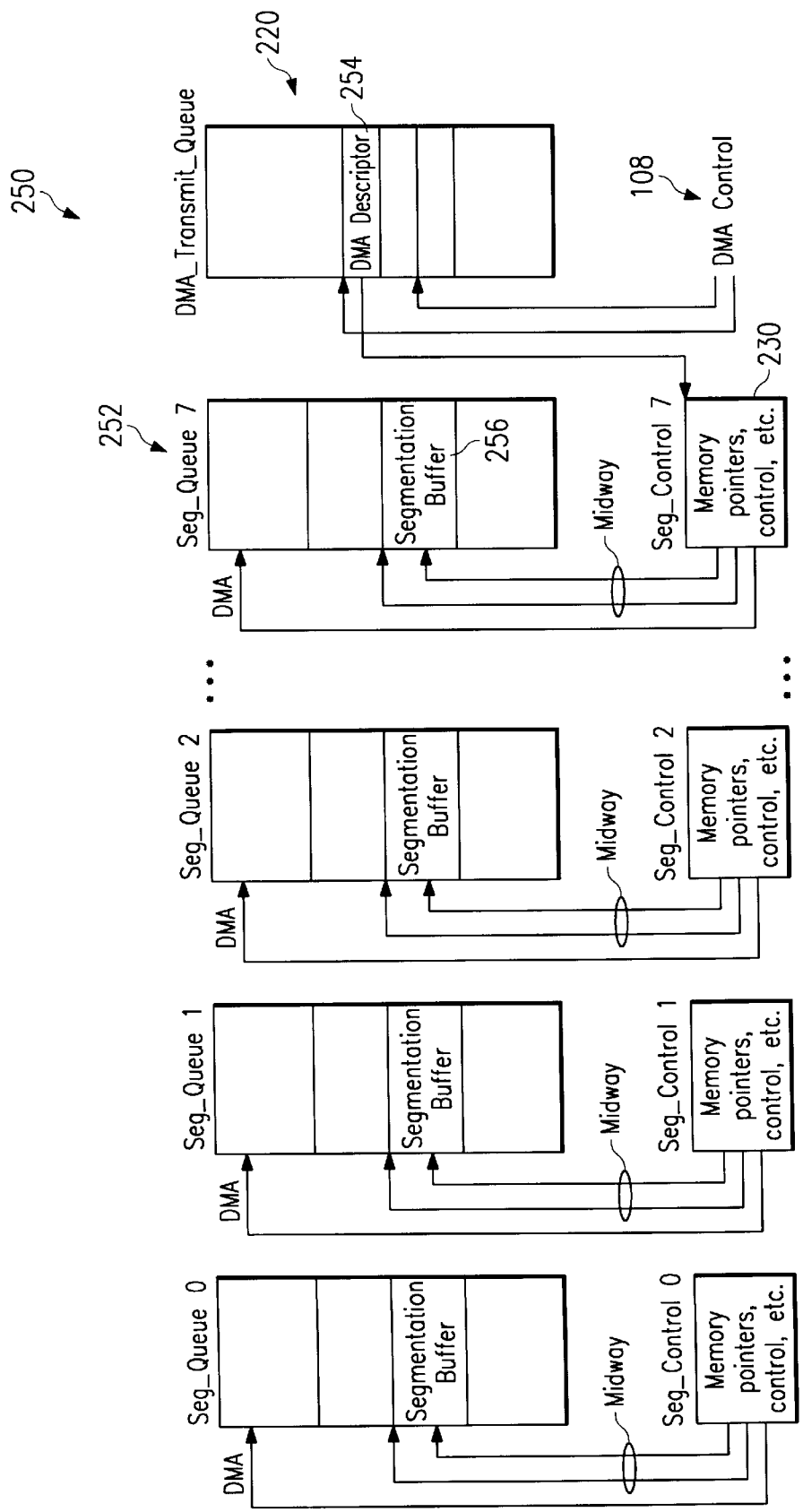
FIG. 29 provides a conceptual illustration of the eight segmentation channels of the present embodiment.

FIG. 29 shows the segmentation data structures 250 that the present embodiment uses. When DMA controller 108 is turned on to start reading DMA descriptors, out of DMA transmit queue 220 it reads a DMA descriptor 254. This determines the host address from DMA descriptor 254 at which data is to be moved into the adapter segmentation buffer. DMA descriptor 254 contains the channel 0 through 7 control, in the sense that the segmentation control register that DMA descriptor 254 contains includes the pointer to where the host memory data is going to be DMAed into the segmentation buffer.

The segmentation control register gets the pointer to host address from the DMA descripter and it gets the address to where that data is going to be moved to into a segmentation buffer on the adapter from the segmentation control register for that channel. Then the DMA process occurs.

FIG. 29, therefore, references three pointers from the segmentation control block. They are the write pointer, the DMA pointer, the DMA descriptor pointer, which is the top one of the segmentation buffer, and the read pointer.

For segmentation operations, the TX_ENABLE bit (FIG. 8) in the master control register will be cleared after reset. When this bit is not set, PHY interface circuit 130 is disabled from sending new data to the physical layer chip. Consequently, segmentation engine 122 is disabled. The TX_ENABLE bit can be set from the host by writing to the master control register. It can be cleared by performing a master reset to ATM ASIC 100.

There are eight segmentation queues 252, one for each segmentation channel. Each segmentation queue 252 is a block of contiguous adapter memory used as a circular FIFO to store segmentation buffers 256 used for PDUs being segmented for transfer.

The host controls the location in adapter memory and the size of each segmentation queue 252 through the location and size fields in segmentation controller circuits 230. It should be noted that the location of a segmentation queue 252 has to be aligned with an address which is an integer multiple of the buffer size. For example, a 32K queue must be located at address 0, 32K, 64K, or 96K, etc.

Figure 30:
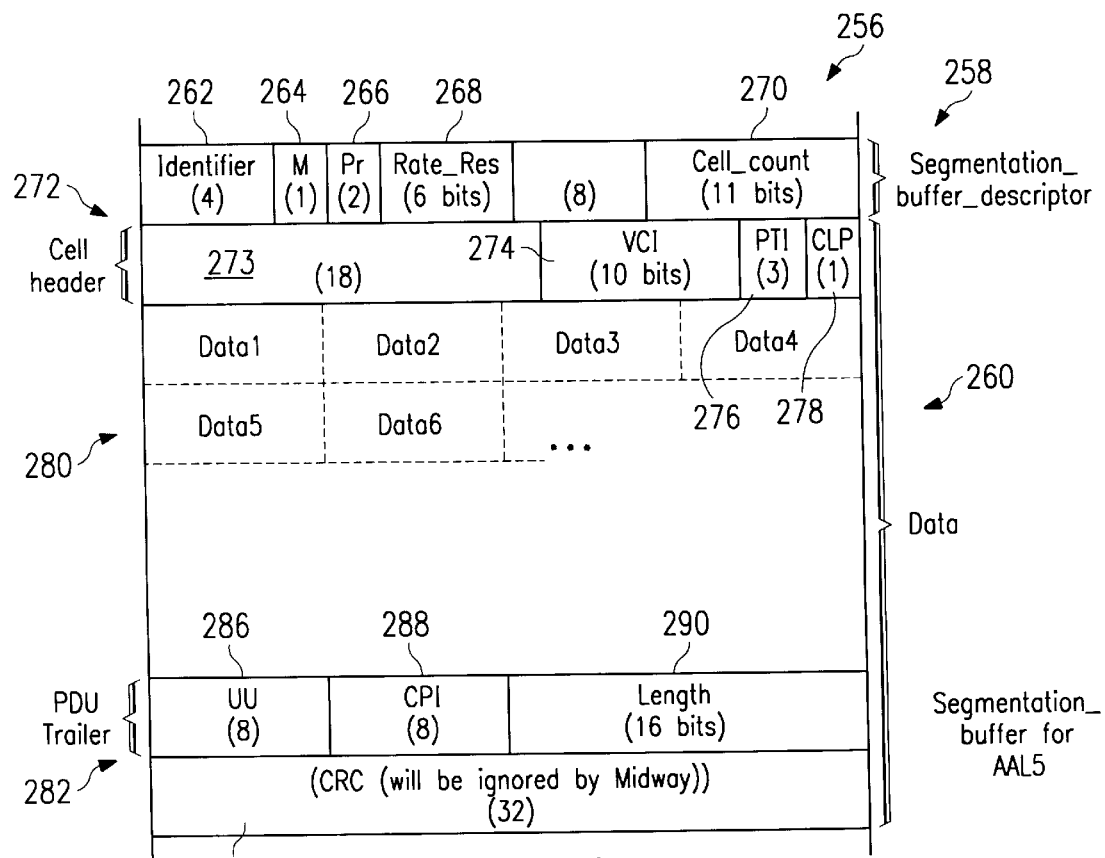
FIGS. 30 and 31 show the bit-aligned contents for AAL5 and non-AAL5 segmentation buffers, respectively, in the present embodiment.

FIG. 30 shows the segmentation buffer 256 for AAL5 mode of operation. Segmentation buffer 256 includes segmentation buffer descriptor portion 258 and data portion 260. Segmentation buffer descriptor 258 includes identifier field 262, mode or M bit 264, prescale or Pr field 266 and rate resolution or Rate Res field 268. Adjacent to rate resolution field 268 is an unused eight-bit field. Cell count field 270 is the next field. Cell header 272 includes an unused 18-bit field 273, as well as VCI field 274, PTI field 276, and CLP field 278 completes segmentation buffer descriptor portion 258. Data portion 260 includes data cells 280, PDU trailer 282, and CRC field 284. Data field 280 includes the data that will be segmented into cells. PDU trailer 282 includes UU field 286, CPI field 288 and length field 290.

Figure 31:
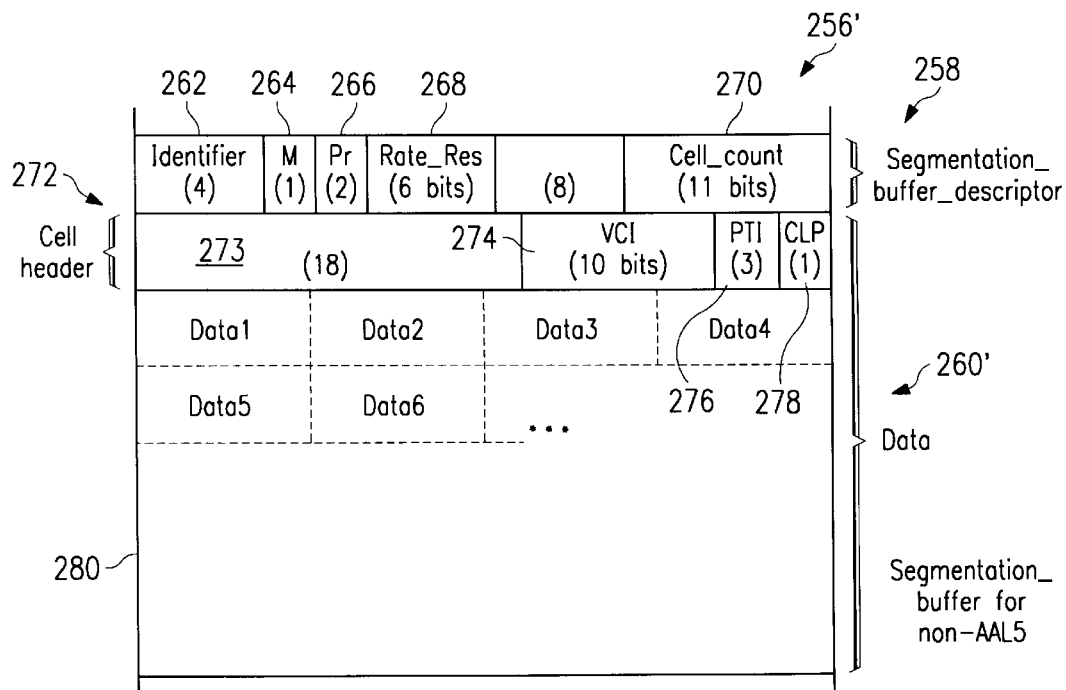

FIG. 31 includes segmentation buffer 256' for the non-AAL5 transfer mode. Similar to segmentation buffer 256, segmentation buffer 256' includes segmentation buffer descriptor portion 258 and data portion 260'. Segmentation buffer descriptor portion 258 includes identifier field 262, which is followed sequentially by M field 264, prescale field 266, rate resolution field 268, and cell count field 270. The second 32 bits of segmentation buffer descriptor portion 258 form cell header 272 and include unused 18-bit field 273, followed by VCI field 274, PTI field 276 and CLP field 278. Data fields 280 also appear in segmentation buffer 256', but neither the PDU trailer nor the CRC are required for non-AAL5 transfer mode. Note that the Non-AAL5 segmentation buffer data field is always 48 bytes, while the AAL5 segmentation buffer is evenly divisible by 48 bytes.

Segmentation buffers 256 and 256' in segmentation queue 252 are variable length from four words to filling the size of the segmentation queue, a word equalling 32 bits. Segmentation buffers 256 and 256' may wrap around in the adapter memory address space within the defined memory block 220 for the segmentation or transmit queue.

The first two words in each segmentation buffer 256, for example, form the segmentation buffer descriptor portion 258, the remaining data portion 260 contains the actual data. The two last words in segmentation buffer 256 are PDU Trailer 282 and CRC field 284.

Identifier field 262 has a special purpose. It provides a four-bit pattern that is written by the host. This value is checked whenever ATM ASIC 100 starts a new segmentation to verify that the segmentation queue 252 is still in sync. M bit 264 specifies the mode of the transfer. If M bit 264 is set to AAL5, then ATM ASIC 100 will perform AAL5 processing on the PDU in data field 260. If the M field 264 bit is set to non-AAL5, then ATM ASIC 100 will segment the data field 260' transparently, i.e., no CRC field 284 insertion, and nothing unusual happens for the PTI field 276. Pr field 266 and Rate Res field 268 hold the prescale and rate resolution parameter values that specify the PCR rate that will be used when segmenting and transmitting this PDU. Cell count field 270 holds the number of cells contained in the Data field.

VCI field 274 is used in the header of every outgoing cell. The remaining bits in the GFC, VPI, and VCI are set to zero for outgoing cells. PTI field 276 is used in the header of every outgoing cell. However, when the M field 264 bit is for AAL5 transfer, PTI bit 1, the STU bit, is controlled by segmentation controller 230, which inserts zeroes for all but the last cell. On the last cell. CLP field 278 is used in the header of every outgoing cell.

Data field 260 contains the CPCS PDU that will be segmented into cells. Data field 260 is an integer multiple of 12 words, or 48 bytes, in length, i.e., including the CPCS padding, PDU trailer 282, and CRC field 284. However, the content of CRC field 284 is ignored and overwritten by ATM ASIC 100 with the result of the CRC calculation as the last cell is transmitted. The bytes are stored in adapter RAM as depicted in FIG. 30 or 31.

PDU trailer field 282, including UU field 286, CPI field 288, and length field 290, is the second to the last word in data field 260. PDU trailer 282 is only required when the M field 264 bit is set for AAL5 mode transfer. CRC field 284 is the last word in data field 260. CRC field 284 is ignored by ATM ASIC 100, because ATM ASIC 100 calculates the CRC for the PDU. CRC field 284 is part of segmentation buffer 256, but generally contains meaningless data until the segmentation engine calculates and sends out the correct CRC.

Each segmentation queue 252 (see FIG. 29) has an ATM ASIC 100 register based control block associated with it; see FIG. 32. The TX_LOCK_MODE control bit (see FIG. 8) in the master control register determines the operation of ATM ASIC 100 in case of DMA overflow in the transmit direction. DMA overflow is defined as the event where the DMA controller 108 is unable to write any more data to a segmentation buffer 256, because the data in the buffer has not been segmented yet. This is detected by DMA controller 108 by comparing the DMA write pointer with the segmentation control read pointer. In this case, the TX DMA OVFL interrupt will be generated.

The TX_LOCK_MODE control bit determines what furthermore happens in case of DMA overflow. If set to zero, the DMA transfers will be suspended until there is room again in segmentation buffer 256. This can be used by the host to queue up more data for transmit than there is bandwidth. Note that this condition will not cause wait states on the host bus. It just means that the next DMA transfer will not be initiated until there is room. However, no receive DMAs can be performed during this time.

If TX_LOCK_MODE set to 1, the TX_ENABLE, RX_ENABLE, and DMA_ENABLE bits (FIG. 8) will all be cleared. This effectively freezes ATM ASIC 100, which may by helpful for debugging purposes.

Figure 33:
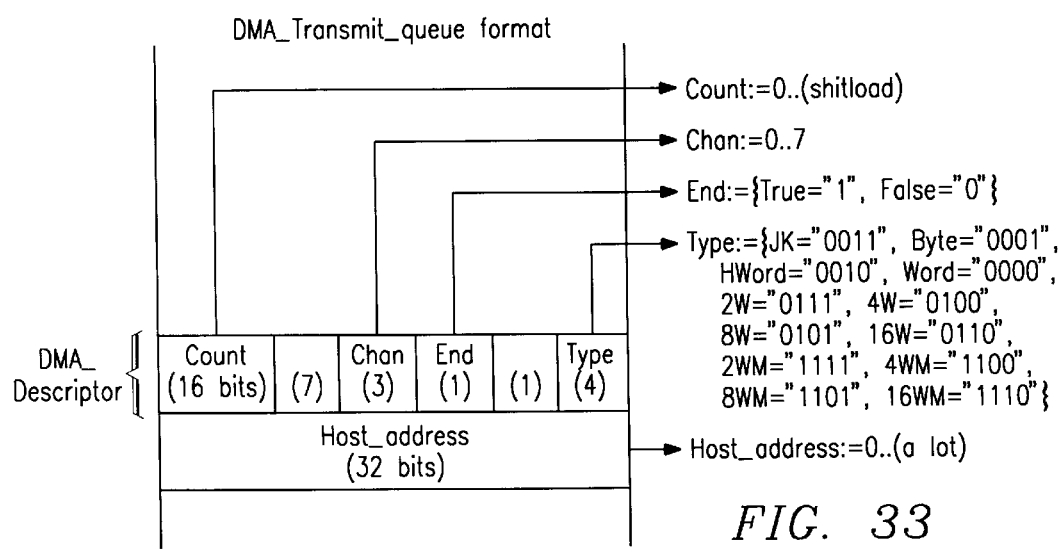
FIG. 33 conceptually illustrates the DMA transmit queue format for the present embodiment.

FIG. 33 shows the format of DMA transmit queue 220. DMA transmit queue 220 includes DMA descriptor 254 which uses 64 bits. DMA descriptor 254 includes count field 300 which uses 16 bits and is adjacent to an unused seven-bit field 302. Adjacent to unused field 302 is three-bit Channel (Chan) field 304. End field 306 adjoins Chan field 304 and is followed by an unused one-bit field 308. Following one-bit field 308 is four-bit Type field 310. Host address field 312 uses 32 bits and completes the configuration of DMA descriptor 254.

DMA transmit queue 220 is a 1K×32 bit circular queue in adapter RAM corresponding to 512 entries and having a fixed location in adapter memory. DMA transmit queue 220 is a queue of DMA descriptors 254 that describe the list of memory blocks to be DMAed from host to adapter memory. The host enqueues the DMA descriptors 254 in the queue when something is to be transmitted.

The host can setup several DMA descriptors 254 for each PDU to optimize the DMA transfer cycles and match the PDU locations in host memory. DMA controller 108 of ATM ASIC 100 will dequeue the DMA descriptors 254 and use the ReadPtr and DescrStart in the segmentation control block (FIG. 32) to do the DMA transfer.

Count field 300 includes the number of transfers to be done. If Type field 310 includes the value for Word, then Count field 310 includes the word count. If Type field 310 includes the value for Half-word, then Count field 300 contains the Half-word count. If Type field 310 includes the value for Byte then Count field 300 contains the byte count. If Type field 310 includes the value for 2W, 4W, 8W, or 16W, then Count field 300 contains the word count divided by 2, 4, 8, or 16. If Type field 310 has a value for 2WM, 4WM, 8WM, or 16WM, then Count field 300 represents the number of words actually transferred in the single burst of the indicated type. If the Type field 310 has a value representing a JK value, the 15 least significant bits of Count field 300 contain the value to be loaded into the DMA write pointer instead of doing a DMA transfer. A Count field 300 value of zero means that no DMA will be performed, however JK with count field 300 equal to zero will still be loaded.

Chan field 304 identifies the segmentation control block (FIG. 32) that contains pointers to the segmentation queue 252 that is to be DMAed from host memory.

End field 306 is set by the host when setting up the DMA descriptor 254 for the last DMA block of a PDU. This is not required, but recommended since bytes or half-words may be lost if these transfer types are used and different channels or transmit and receive direction are mixed in the middle of the same PDU. When the block has been DMAed to adapter memory and the End field 306 bit is set, this causes the DescrStart pointer to be advanced to the end of the segmentation buffer 256 which was just DMAed. This load adapter memory with the value in the DMA Write Pointer. Furthermore, the transmit DMA receive interrupt will be generated through the host. DMA controller 108 will then check DMA receive queue 218 to see if any DMA received descriptors are ready for DMA transfer into the host. If so, the DMA cycle will begin. If not, the DMA controller 108 will transfer into the host in an idle state. Furthermore, a TX DMA COMPLETE interrupt will be generated to the host.

Type field 310 determines the transfer type used for the memory block transfer according to predefined values. For example, if the Type field value equals JK, this means that the "Just Kidding" DMA is present. In this case, the value in Count field 300 will be loaded into the DMA write pointer field to effectively skip a block of memory. If the Type field 310 equals Byte this means that eight-bit transfers are called for. Count field 300 contents then determines the number of byte transfers. If the Type field 310 equals HWord, this means that 16-bit half-word transfers are called for. Count field 300 contents then determines the number of half-word transfers. If the Type field 310 equals Word this means that 32-bit word transfers are called for. Count field 300 contents then determine the number of word transfers. If the Type field 310 value equals 2W, 4W, 8W, or 16W, this means that bursts of 2,4,8, or 16 words are called for. Count field 300 contents then determine the number of bursts.

If the Type field 310 value equals 2WM, 4WM, 8WM, or 16WM (WM meaning "Words Maybe"), this means that one single burst of 2,4,8, or 16 words are called for. Count field 300 contains the value of the number of words to be actually transferred during this burst. DMAed data will be ignored for the remainder of the burst.

Host address field 312 provides the source address in host memory where the DMA transfer will start. If Type field 310 contains the JK value, then host address field 312 is ignored.

FIG. 34 provides a table describing the DMA transmit queue fields to illustrate the two pointers that ATM ASIC 100 directs DMA transmit queue 220, namely DAMWr_tx and DMARd_tx. See also, FIGS. 14 and 15, above. If DMAWr_tx and DMARd_tx are equal, then DMA transmit queue 220 is empty. The host must never increment DMAWr_tx so that it becomes equal to DMARd_tx. Note that the host is recommended to setup the descriptors for an entire buffer before updating the DMAWR_tx pointer to the next free location in the queue. This is to avoid idle time waiting for transmit descriptors while receive DMAs could have been performed. In using JK type DMA descriptors, all 15 least significant bits of count field 300 are loaded into the DMA write pointer by the DMA controller 108, regardless of the location and size parameters. The host is, therefore, required to zero out any high order bits in count field 300 that should not be used.

Traffic shaping is performed on each segmentation channel 252 using peak cell rate (PCR) counter circuit 322 and across channels using an arbiter/multiplexer 232. Multiple VCIs using different PCR rates can share a segmentation channel 240, and be multiplexed at the PDU level. The segmentation channels 240 are multiplexed together at the cell level using arbiter circuit 232. =p mIn the present embodiment, channel 0 has lower priority than the other channels. This means that channel 0 can be programmed to a higher rate than what is available. In this case, channel 0 will only get the remaining bandwidth if no other channels are using it. Channel 0 is, therefore, also referred to herein as the available bit rate channel.

There are two parameters for traffic shaping: (1) prescale, and (2) rate resolution. The parameters are passed from the segmentation buffer descriptor to the segmentation control block (FIG. 32) at the start of a PDU transfer. Two-bits of prescale and six-bits of PCR resolution are supported.

Arbiter circuit 232 looks at Value 336 from all eight channels, gives a Grant 334 to the channel with the highest value. Channel 7 has highest priority, channel 0 has lowest priority. Channel 0 can only have a value of zero or one in arbiter circuit 232. If the total allocated bandwidth is higher than the line rate, Value 336 fields will overflow and stand on their maximum possible values. In this case, the PCR parameters cannot be guaranteed. Note that the priority between the eight channels does not affect the rates of the outgoing traffic. Rates are guaranteed in any channel, as long as the total rate is lower than line rate. The priority does, however, affect the burstiness of the outgoing traffic. To that extent, a high bandwidth in a low priority channel will be more bursty than in a high priority channel.

Prescale field 266 of segmentation buffer 256 defines the prescale divisor used in prescaler circuit 38 to be either 4, 16, 128, or 2048. These values provide high granularity on both high and low bit rates. PCR rates are calculated using the following formulas:

$$PCR\left[\frac{\text{cells}}{\text{sec}}\right] = \frac{25 \times 10^6}{PrescaleDivisor \times (RateResolution + 1)} \quad (1)$$

$$PCR\left[\frac{\text{bits}}{\text{sec}}\right] = \frac{25 \times 10^6 \times 53 \times 8}{PrescaleDivisor \times (RateResolution + 1)} \quad (2)$$

FIG. 36 shows some possible PCR rates as a function of the Pr field 266 Value (i.e., prescale divisor) and rate resolution field 268 value. When the available bit rate channel, i.e., channel 0, is programmed to a certain rate, it will only get to transmit at that rate if there is enough bandwidth left over from the other seven channels. The transmitted distribution of the bandwidth is undefined when the total allocated bandwidth for channels 1 through 7 exceeds the line rate. That is, the algorithm is unfair when more that the line rate is allocated, except for channel 0.

The size and location of the Segmentation queues 252 and the Reassembly queues (FIGS. 39–41) is controlled using Location and Size parameters in the VCI Table (FIG. 40) and the Segmentation Control blocks (FIG. 32). These parameters are interpreted according to the process that FIG. 37 illustrates.

Figure 38:
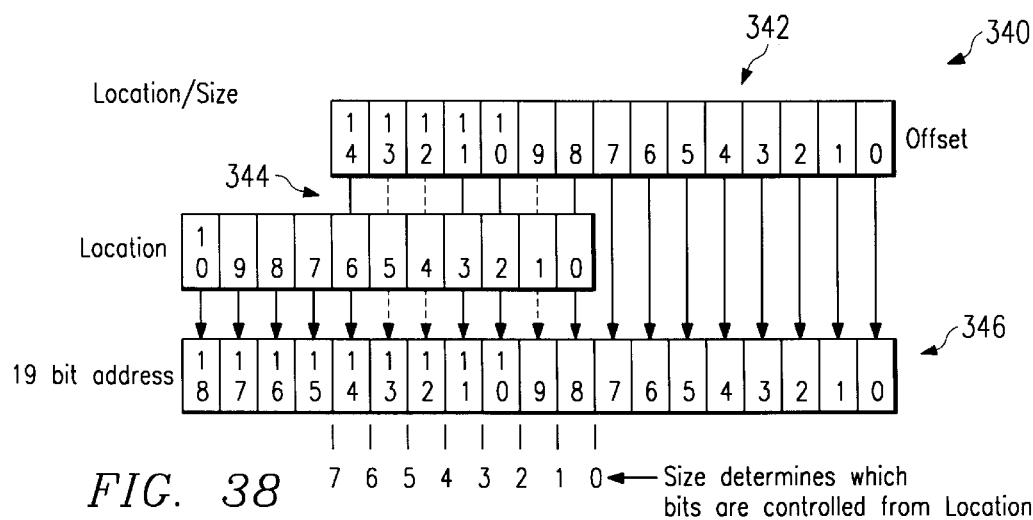
FIG. 38 illustrates building the 19 bit addresses when addressing into a segmentation or reassembly queue in the present embodiment.
Figure 39:
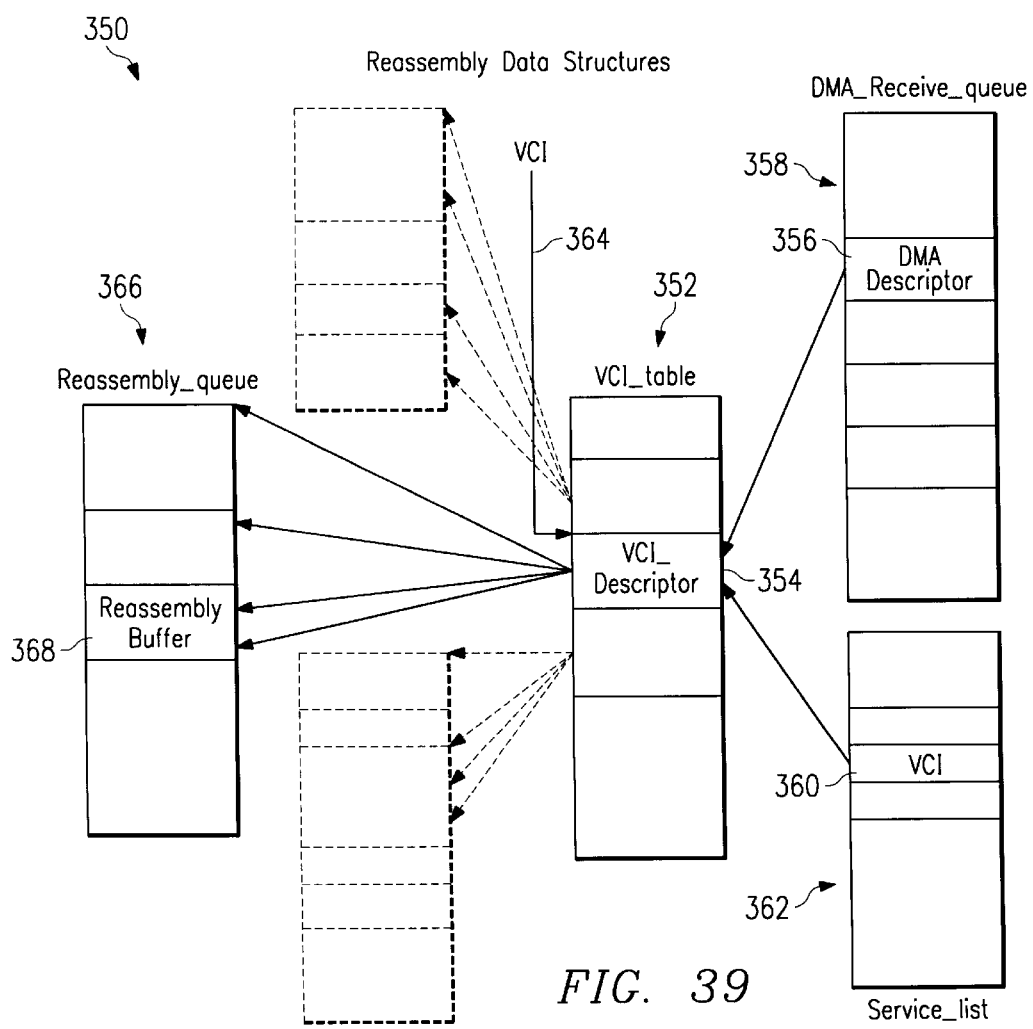
FIG. 39 conceptually illustrates the reassembly data structures that the present embodiment uses.

FIG. 38 shows control diagram 340 that illustrates how the present embodiment builds 19-bit addresses into a segmentation queue 252 or a reassembly queue (FIG. 39). In control diagram 340, there appears Offset bits 342 that associate with Location bits 344 and 19-bit address 346. The address is build from the Offset 342, which is whatever pointer or counter used to point to the data words, and the Location 344. The eight least significant bits are always taken from the eight least significant bits in Offset bits 342. The next seven bits are taken from Offset bits 342 or from Location bits 344—the dividing line is determined by the Size parameter. The four most significant bits are taken from the most significant bits of Location bits 344. Unused bits are ignored by ATM ASIC 100.

FIG. 39 illustrates the reassembly data structures that reassembly engine 124 of ATM ASIC 100 uses. An important reassembly data structure is VCI table 352. VCI table 352 includes VCI descriptor 354 that receives DMA descriptor 356 from DMA receive queue 358. In addition, VCI descriptor 354 receives VCI 360 from Service List 362. A VCI table 352 exists for each VCI channel 364. From VCI descriptor 354 output goes to various assembly queues such as reassembly queue 366. Reassembly queue 366 includes various buffers including reassembly buffer 368.

When a PDU has been reassembled and completed in the reassembly buffer, the reassembly engine will update the service list with information that the reassembly for that VCI has been completed. The service list is essentially the VCI number. The VCI number points to the VCI table and references the object location for VCI descriptor of that VCI number. At that time, the host will be interrupted with information that it has a completed PDU that is reassembled. The host then reads the service list and determines which VCI has been reassembled. Then it reads the VCI descriptor, which contains the read pointer to where the reassembly has occurred. The host then reads the VCI descriptor and the DMA descriptor, and turns on the DMA engine for the DMA engine to reassemble the PDU back into the host.

The host then reads the VCI descriptor which contains the read pointer and descriptor start values. Those fields are used by the host to build the DMA descriptor. The arrows in FIG. 39, therefore, indicate references, and not data flow.

The flow of operations, therefore, is that reassembly engine is reassembling data from cells. Once the reassembly is complete on a PDU, the reassembly engine puts the VCI into the service list. This interrupts the host. The host then reads the service list, finds out the VCI, reads the VCI descriptor, checks the status by looking at the PTI-mode and the service list until the DMA from the adapter goes into the host. The read descriptor, read pointer, and cell cap are used to build the DMA descriptor.

Referring to FIGS. 3 and 39, reassembly engine 124 reassembles CPCS PDUs and works in concert with DMA controller 108 and the host processor. Receive engine 124 supports up to 1024 simultaneous reassemblies. For each VCI channel 364 being reassembled, reassembly queue 366 is allocated in adapter memory which is used for work space for the reassembly process. ATM ASIC 100 will perform AAL5 processing on the cells (CRC-32, etc.) as they are received. In each reassembly queue 366, reassembly buffers 368 are allocated as needed by reassembly engine 124 for every incoming CPCS PDU. Reassembly queue 366 is a circular FIFO data structure implemented in adapter memory. The host is interrupted when a reassembly buffer 368 is ready for DMA transfer to the host memory. The host dequeues the reassembly buffer 368 and adds it to a DMA chaining list. DMA controller 108 then transfers the reassembly buffer 368 to host memory and interrupts the host. The reassembly buffer 368 is then freed as the DMA transfer proceeds.

ATM ASIC 100 can receive two types of traffic: (1) AAL5; and (2) non-AAL5. Non-AAL5 traffic is basically transparent to ATM ASIC 100, as no special processing is performed. Each VCI 364 can be configured as AAL5 or non-AAL5. In addition, ATM ASIC 100 has an extra OAM non-AAL5 channel used for OAM flows. This special OAM channel is VCI channel 3 in the present embodiment. In the present embodiment VCI channel 3 is already reserved for F5 OAM flows in the UNI.

Reassembly engine 124 supports 10 bits of VCI addressing. These are the 10 least significant bits of VCI field. All other VCI, GFC and VPI bits are ignored by the receiver. Thus, a cell with VCI=1025 will be processed as VCI=1.

Referring in more particularity to FIG. 39 there appear reassembly data structures 350 for the reassembly process. The procedures performed during reassembly by ATM ASIC 100 and the host are described in even greater detail below. ATM ASIC 100 also has an internal work space used when processing incoming cells.

The RX_ENABLE bit (FIG. 8) in the master control register will be cleared after reset and in case the segmentation engine 122 detects a software bug. When this bit is cleared, the PHY interface circuit 130 is disabled from receiving new data from the physical layer chip. Consequently, the reassembly engine 124 is disabled. The RX_ENABLE bit can be set from the host by writing to the master control register. If the host would ever want to clear this bit, this can be done by performing a master reset to ATM ASIC 100.

Figure 40:
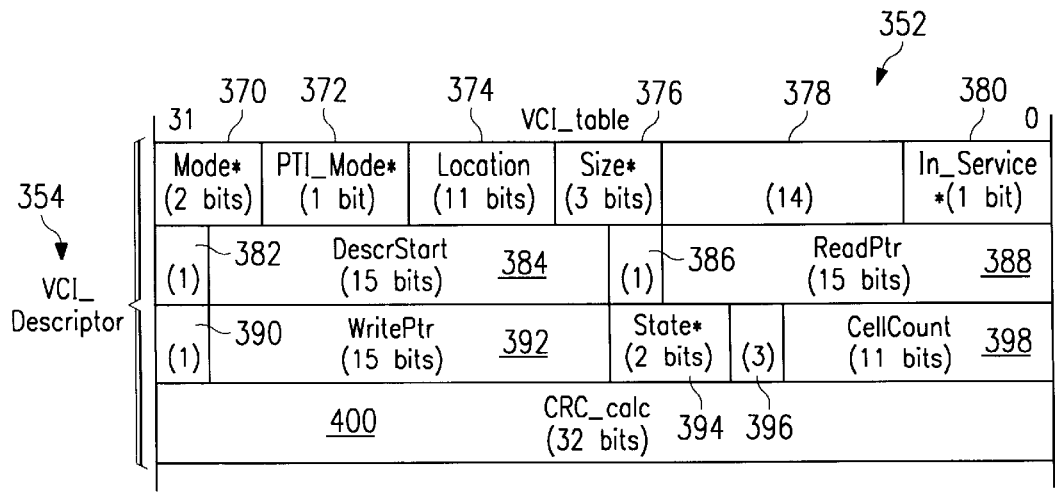
FIG. 40 depicts the format of the VCI table of the present embodiment.

FIG. 40 details VCI table 352 which includes VCI descriptor 354. VCI descriptor 354 includes numerous fields including mode field 370 that is adjacent to PTI_mode field 372. Location field 374 includes 11 bits and is adjacent to Size field 376. An unused 14-bit field 378 separates Size field 376 from In Service bit 380. Other fields within VCI descriptor 354 include single-bit field 382 that is adjacent to 15-bit Descriptor start field 384. Single-bit field 386 separates Descriptor Start field 384 from Read Pointer field 388. After Read Pointer 388 is single-bit 390, which itself is adjacent to write pointer 392. Write pointer field 392 adjoins State field 394. Unused three-bit field 396 is adjacent to 11-bit Cell Count field 398. A further field of VCI descriptor 354 is CRC calculation field 400 which includes 32-bits.

VCI table 352 is a 1024 entry table (4K×32 bits) in adapter memory used to store information about the different VCIs and appears as VCI table block 216 in memory map 200 of FIG. 27, above. The offset into VCI table 352 is the ten-bit VCI directly.

In VCI Table 352, Mode field 370 identifies the current mode of the VCI number corresponding to this location in the table. For example, if the Mode field 370 value equals the value for Trash then all incoming cells with this VCI will be trashed, except for cells with the PTI bit 2 set to one. This is controlled by PTI_mode field 372. If the Mode field 370 value equals AAL5, then incoming cells with this VCI will be (or are being) reassembled in a Reassembly queue 368 (which can be identified by Location and Size) and AAL5 processing is performed. Furthermore, if the Mode field 370 value equals Non-AAL5, then incoming cells with this VCI will be enqueued in the Reassembly queue (identified by Location and Size) but no AAL5 processing is performed.

PTI_mode field 372 identifies what ATM ASIC 100 does with cells received with PTI(2) set to one. Bit 2 of the PTI field in the cell header set means one of the following: (1) segment F5 cell, (2) end-to-end F5 cell, (3) reserved, or (4) reserved. If the PTI field 372 value equals the Trash value, then all cells received with this VCI with the PTI(2) bit set will be trashed. If the PTI field 372 value equals the Preserve value, then all cells received with this VCI with the PTI(2) bit set will be directed to the OAM channel and processed as described below.

In Service field 380 identifies whether or not the VCI is currently placed in the Service List (FIG. 43).

State field 394 identifies the current state of the VCI. If the State field 394 value equals the Trashing value, then incoming cells with this VCI will be trashed until the last cell of a PDU is received, in which case the State field 394 value will change to the Idle value. If the State field 394 value equals the Reassembling value, then a PDU is being reassembled for this VCI in the Reassembly-queue identified by Location and Size for this VCI. If the State field 394 value equals the Idle value, then no PDU is currently being reassembled for this VCI.

When Mode field 370 has a Trash value, the State field 394 value is set to Trashing whenever a cell is trashed for this VCI. This includes OAM cells when the PTI_mode field 372 has a Trash value.

Location field 374 is the (up to) 11 most significant bits of the address location of the corresponding reassembly queue 368 adapter memory. Size field 376 determines the number bits in location field 374 that used by ATM ASIC 100 to build the 19-bit address, as described in FIG. 38. The (up to) seven unused least significant bits of Location field 374 must be set to zeros. Size field 376 determines these bits.

Size field 376 specifies the size of reassembly queue 368. Eight different sizes are defined, including 256, 512, 1K, 2K, 4K, 8K, 16K, and 32K times 32 bits, i.e., from 1K to 128K bytes. When 256 is selected, all bits of Location field 374 are used. When 32K is selected, only the four most significant bits of Location field 374 are used.

WritePtr field 392 points to the next free 32-bit word which will be overwritten by the next reassembled word in the reassembly queue 368. ATM ASIC 100 compares the value in WritePtr field 392 plus 1 to the value in ReadPtr field 388 before every write to avoid overflows. The (up to) seven most significant bits of this field are zero when written by ATM ASIC 100. The Size field 376 value determines these bits. ReadPtr field 388 points to the last 32 bit word that was DMAed to host memory from Reassembly queue 368. The ReadPtr field 388 value is equal to the DescrStart field 384 value when nothing is to be DMAed. The (up to) seven most significant bits of this field are zero when written by ATM ASIC 100. The Size field 376 value determines these bits.

DescrStart field 384 points to the start of reassembly buffer descriptor (see FIGS. 41 and 42) that is currently being reassembled in reassembly queue 366 or to the next free location in adapter memory when the channel is Idle. ATM ASIC 100 compares DescrStart+1 with ReadPtr before starting a new PDU reassembly. The (up to) seven most significant bits of DecrStart field 384 are zero when written by ATM ASIC 100. The Size field 376 value determines these bits.

CellCount field 398 contains the temporary cell count for the PDU currently being reassembled. CRC calc field 400 contains the temporary CRC value being calculated for the PDU currently being reassembled.

In the present embodiment, note that VCI table entry 3 is special in that it is used for all F5 OAM cells from all VCIs. When the PTI_mode field 374 value in a VCI Descriptor is set to Preserve, then incoming OAM cells are directed to channel 3 and processed as non-AAL5 cells. In such a case the values for Mode field 370, PTI_mode field 372, State field 394, CellCount field 398, and CRC calc field 400 for VCI channel 3 are not used by ATM ASIC 100. Incoming cells that have a VCI channel 3 value are controlled in the normal manner through the values of Mode field 370 and PTI_mode field. Also in such a case, the Mode field 370 value should be set to Trash and the PTI_mode field 372 value can optionally be set to Trash. Alternatively, the host can ignore all OAM cells by setting the PTI_mode field 372 value to Trash for all VCIs and using VCI channel 3 as a normal channel, although this does not comply with UNI specifications.

Access privileges to the VCI descriptor for reading and writing are also controlled by the present embodiment. For example, reassembly engine 124 has read access to the whole of VCI descriptor 354 and write access to In Service field 380, WritePtr field 392, DescrStart field 384, State field 394, CellCount field 398, and CRC calc field 400. Reassembly engine 124, however, does not have write access to ReadPtr field 388, Mode field 370, PTI_mode field 372, Location field 374, or Size field 376.

DMA Controller 108 has read access to the whole of VCI descriptor 354, but will only use Location field 374, Size field 376, and ReadPtr field 388. DMA controller 108 has write access only to ReadPtr field 388.

The host has read and write access to the whole of VCI descriptor 354, but the host will only write to In Service field 380 during the normal receive procedure. That is, the host will actually rewrite the contents of Mode field 370, PTI_mode field 372, Location field 374, and Size field 376 without changing them. When the host wants to make changes to VCI descriptor 354, it should first change the Mode field 370 value to a Trash value and then wait the time it takes for ATM ASIC 100 to process a cell (below 2.7 μsec) before assuming that ATM ASIC 100 will no longer change any entries for this VCI. Furthermore, the host should wait until all scheduled DMAs for this VCI are complete. This is because DMA Controller 108 will change ReadPtr in the mean time. Before turning on a VCI, the host sets a VCI descriptor state variable to Idle and initializes parameters including the VCI descriptor.DescrStart and VCI Descriptor-ReadPtr parameters. Then the host can change the Mode field value to AAL5 or non-AAL5, as appropriate.

Partial write operations to less than 32 bits in memory are done by asserting the required control lines to the RAM chips. This is controlled by the RAM interface/arbiter circuit 112, but this does not affect the host in any way.

The host will reserve a reassembly queue 368 for each open VCI. Each reassembly queue 366 is a block of contiguous adapter memory used as a FIFO to store reassembly buffers 368 in which the incoming cells are reassembled into PDUs. The host controls the location in adapter memory and the size of each reassembly queue 368 through the values of Location field 374 and Size field 376 in VCI Descriptor 354. It should be noted that the location of a reassembly queue 366 is aligned with an address which is an integer multiple of the reassembly buffer 368 size. For example, a 32K queue is located at address 0, or 32K, or 64K, or 96K, etc.

Figure 41:
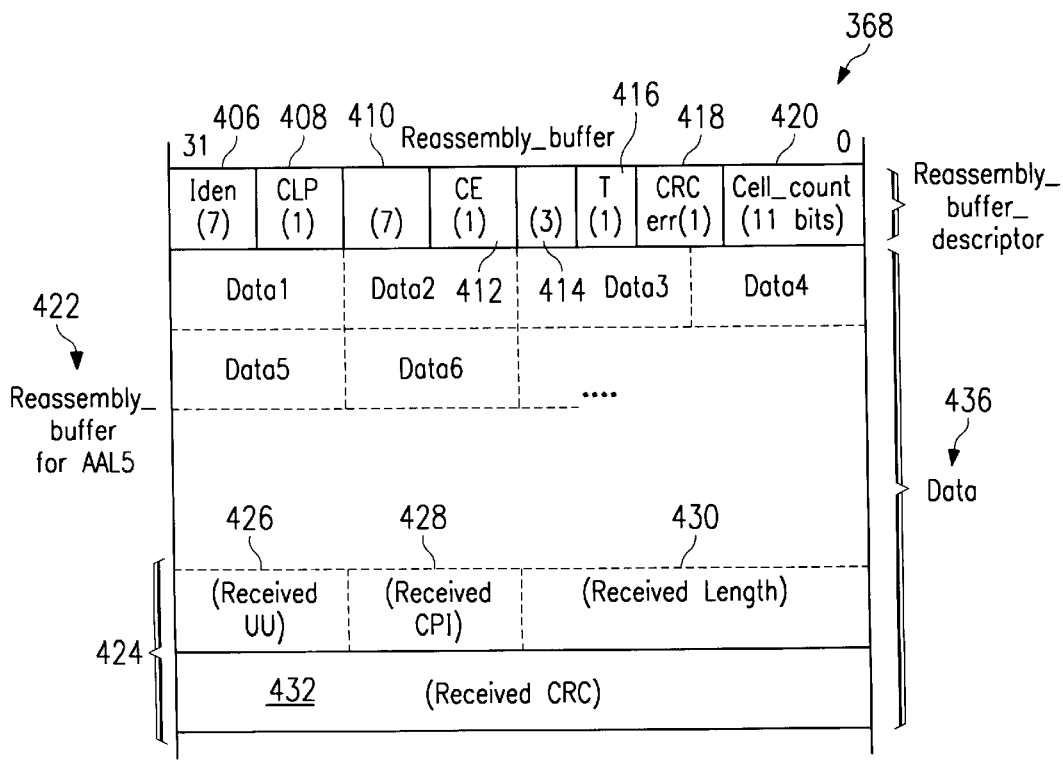

FIG. 41 shows the format of reassembly buffer 368 including reassembly buffer descriptor portion 402 and data portion 404. Reassembly buffer descriptor portion 402 includes Identifier or Iden field 406 that is adjacent to Cell Loss Priority or CLP field 408. An unused seven-bit field 410 follows, after which Congestion Experienced or CE field 412 appears. Then, after an unused three-bit field 414 appears single-bit Trash or T field 416 and Cyclic Redundancy or CRC error bit 418. Cell count field 420 has 11-bits and completes the reassembly buffer descriptor portion 402. Data portion 404 includes data fields 422 and receive trailer 424. Received trailer 424 includes Received UU field 426 which adjoins Received CPI field 428. Receive CPI field 428 adjoins Received length field 430. Receive CRC field 432 forms the remainder of Receive trailer 424.

FIG. 42 shows the reassembly buffer 368' for non-AAL5 mode transfer. Reassembly buffer 368' includes reassembly buffer portion 434 and data portion 436. Like reassembly buffer descriptor portion 402 of reassembly buffer 368 in FIG. 41, reassembly buffer descriptor portion 334 includes identifier field 406 and T field 416. Reassembly buffer descriptor portion 434, however, does not include CLP field 408, CE field 412, CRC error field 418, or cell count field 420. In data field 436 of reassembly buffer 368, there also appears the 32-bit cell header field 438.

Reassembly buffers 368 and 368' in Reassembly queue 366 are variable length from one word to a complete set of words (a word equalling 32 bits). For VCIs in AAL5 mode, the buffer will be written in steps of 12 words (recalling that 12 words equals 48 bytes or one cell payload). For VCIs in non-AAL5 mode, the 13 words (13 words equalling 52 bytes or one ATM cell without the HEC) will be written to the reassembly buffer 368. Reassembly buffers 368 and 368' may wrap around in the adapter memory address space within the defined memory block 224 (FIG. 27) for reassembly queue 366.

The first word in reassembly buffer 368 is reassembly buffer descriptor 402, the remaining data portion 404 contains the actual data. In reassembly buffer 368, Iden field 406 has a strange potential purpose. It provides the host with a way to verify that the DMAed buffers are in sync with the received PDUs. ATM ASIC 100 will write a unique value into this field when starting a reassembly in the queue, this value can optionally be checked by the host.

CLP field 408 is the Cell Loss Priority bit. This bit will be set if any of the received cells in the PDU had the CLP bit set. The content of this bit is undefined for VCIs in the non-AAL5 mode. CE field 412 is the Congestion Experienced bit. This bit will be set if any of the received cells in the PDU had the PTI(1) bit set. The content of this bit is undefined for VCIs in non-AAL5 mode. T field 416 is the Trash bit and is set if the Cell count is a count of trashed cells, and Data field 404 is empty. In such a case, the next buffer descriptor starts at the address immediately following this descriptor. T field 416 will be set in case of overflows in reassembly buffer 366.

CRC field 418 includes an error bit to indicate that the received PDU CRC-32 had errors. The content of this bit is undefined for VCIs in non-AAL5 mode. This bit is also undefined when the T field 416 bit is set. Cell count field 420 holds the number of cells contained in the Data field. If the T bit is set, then the value of Cell count field 420 is the count of trashed cells. A Cell count field 420 value of zero generally does not occur. The Cell count field 420 value is undefined if the VCI is in non-AAL5 mode or if this is VCI channel 3 being used for OAM.

Data field 404 contains the reassembled cell payloads which include the CPCS PDU together with the CPCS trailer. The incoming bytes are stored in adapter memory as depicted in FIGS. 41 and 42. Note that when a VCI is in non-AAL5 mode or if the VCI channel is channel 3 being used for OAM cells, then the first four bytes in the data field contain the ATM cell header except the HEC field.

FIG. 43 depicts a Service List 440 format which includes service read fields 442 and service write field 444. Service read field 442 includes VCI number fields 446 which are adjacent to fields 448 which are composed of all zeroes. Service write field 449 follows service read fields 442.

Service List 440 is a 1K entry circular list in adapter memory and occupies block 222 of memory map 200 (FIG. 27). Service List 440 provides a list of VCI channels waiting to be serviced by the host because something is ready to be enqueued for DMA. ATM ASIC 100 adds a VCI to the list every time it has finished reassembling a PDU or after received a cell in the non-AAL5 mode, unless the VCI is already in Service List 440. This is indicated by a parameter, VCI descriptor. In Service, having a set value. The host reads the VCIs from Service List 440 and generates the adequate entries in DMA receive queue 218 for the PDUs in reassembly queue 366. The host is required to clear the VCI Descriptor.In Service parameter bit when removing the VCI from Service List 440.

In Service List 440, VCI-number field 446 is a ten-bit value ranging from 0 to 1023. Service List 440 is implemented in the present embodiment as 1K×32 bits in adapter memory. FIG. 44 provides a table that describes the ATM ASIC 100 pointer into Service List 440. In the present embodiment, the host also keeps a ServRead pointer to the beginning of Service List 440. Note that it is not required to check for overflows in Service List 440, since there can only be a maximum of 1024 Service list 440 entries.

It is worthy of noting that the first thing the host must do when servicing a VCI is to clear the VCI Descriptor.In Service bit and then read the VCI Descriptor.DescrStart parameter. Next, the host sets up the DMA process. In the case that ATM ASIC 100 finishes a new PDU between the In-Service clear and the DescrStart read, ATM ASIC 100 will set the Descriptor.In Service bit and put the VCI in Service List 440, while incrementing ServWrite bit. The host will process the PDU immediately, however, because the host will read the new DescrStart. This means that when the host comes back to service the next interrupt, there will potentially be an entry in Service List 440 without anything to service. The host is required to ignore this but still clear the Descriptor.In Service bit.

FIG. 45 shows a format diagram 450 for the DMA receive queue. DMA receive queue format 450 includes DMA descriptor 356 which is composed of count field 452. Count field 452 is adjacent to VCI field 454. Adjacent to VCI field 454 is End field 456. An unused one-bit field 458 separates End field 456 from Type field 460. The remaining portion of DMA descriptor 356 is Host Address field 462.

DMA receive queue format 450 is a 1K×32 bit circular queue in adapter memory, which in the present embodiment occupies block 218 of memory map 200 (FIG. 27). DMA receive queue 450 is a queue of DMA descriptors 356 that describe the list of memory blocks to be DMAed from the ATM adapter of the present embodiment to the host memory. The host enqueues DMA descriptors 356 in DMA receive queue 450 after having reading the VCI from Service List 440. The host can setup several DMA descriptors 356 for each PDU to optimize the DMA transfer cycles and fit the PDU into predefined locations in host memory. DMA Controller 108 of ATM ASIC 100 will dequeue the DMA descriptors 356, read the VCI-descriptor.ReadPtr, and do the DMA transfer.

In DMA receive queue format 450, Count field 452 holds the number of transfers to be done. If Type field 460 contains the value for Word, then Count field 452 contains the word count. If Type field 460 contains the value for 2W, 4W, 8W, or 16W, then Count field 452 contains the word count divided by 2, 4, 8, or 16. If Type field 460 contains the value for 2WM, 4WM, 8WM, or 16WM (WM meaning Words Maybe), then the least significant bits of Count field 452 contain the number of words to be transferred in the single burst of type Type. If Type field 460 contains the value JK, then the 15 least significant bits in Count field 452 contain the value to be loaded into the ReadPtr for VCI Descriptor 354. A Count field 452 value equal to zero is invalid, except for WM cycles.

VCI field 454 identifies the VCI table 352 entry that points to the reassembly queue 366 with the data to be DMAed. VCI field 454 is ignored for all but the DMA descriptor 356 that follows a DMA Descriptor with the End field 456 bit set, or following DMA ENABLE being set by the host.

End field 456 is set by the host when setting up the DMA descriptor 356 for the last DMA block of a PDU. In the present embodiment, the host can chose not to set the End field 456 bit for every PDU, if several PDUs are to be DMAed from the same VCI. The End field 456 bit must be set in the last DMA Descriptor 356 for the VCI. When it has a True value, this bit causes DMA controller 108 to check DMA transmit queue and to generate an RX DMA COMPLETE (see FIG. 6) interrupt to the host when the block has been DMAed to host memory.

Type field 460 determines the transfer type used for the memory block transfer. If the value in Type field 460 has the value JK, then a "Just Kidding" DMA is to occur. In this case, the value in Count field 452 will be loaded into the ReadPtr field 388. This is used to skip a block of memory instead of performing DMA transfers.

If the value in Type field 460 is Word, then a 32 bit word transfers are to take place, with the value in Count field 452 determining the number of word transfers. If the value in Type field 460 is 2W, 4W, 8W, or 16W, then the reassembly buffer contains, with the value in Count field 452 determining the number of buffers. If the value in Type field 460 is 2WM, 4WM, 8WM, or 16WM (WM meaning Words Maybe), then a single burst of 2, 4, 8, or 16 words is to occur, with the value in Count field 452 determining the number of words to be actually transferred during this burst. Undefined data will be transferred for the remainder of the burst. If Type field 460 contains an undefined pattern, then the result is undefined.

Host address field 462 is the target address in host memory where the DMA transfer will start. If Type field 460 contains the JK value, then this field is ignored. ATM ASIC 100 has two pointers into DMA receive queue 450: (1) DMAWr_rx (see also FIG. 12); and (2) DMARd_rx (see also FIG. 13). These are described more specifically in FIG. 46. If DMAWr_rx and DMARd_rx are equal, then DMA receive queue 450 is empty. The host must never increment DMAWr_rx so that it becomes equal to DMARd_rx.

The host is recommended to setup the DMA descriptors for an entire reassembly 366 buffer before updating the DMAWr_rx pointer to the next free location in the queue. This is to avoid idle time waiting for receive descriptors while transmit DMAs could have been performed. See FIG. 3 and the related discussion concerning host interface circuit 106 for bus specific information on DMA transfers.

Note also that when using "JK" DMAS, all 15 least significant bits of Count field 452 are loaded into the ReadPtr 388 by DMA engine 124 regardless of the Location field 374 and Size field 376 values. The host is, therefore, required to zero out any high order bits in Count field 452 that are not to be used.

ATM ASIC 100 also keeps a copy of some of the VCI descriptors 354 that are currently being processed internally. ATM ASIC 100 will read in whatever it needs, update the fields, and write back whatever changed.

Figure 47:
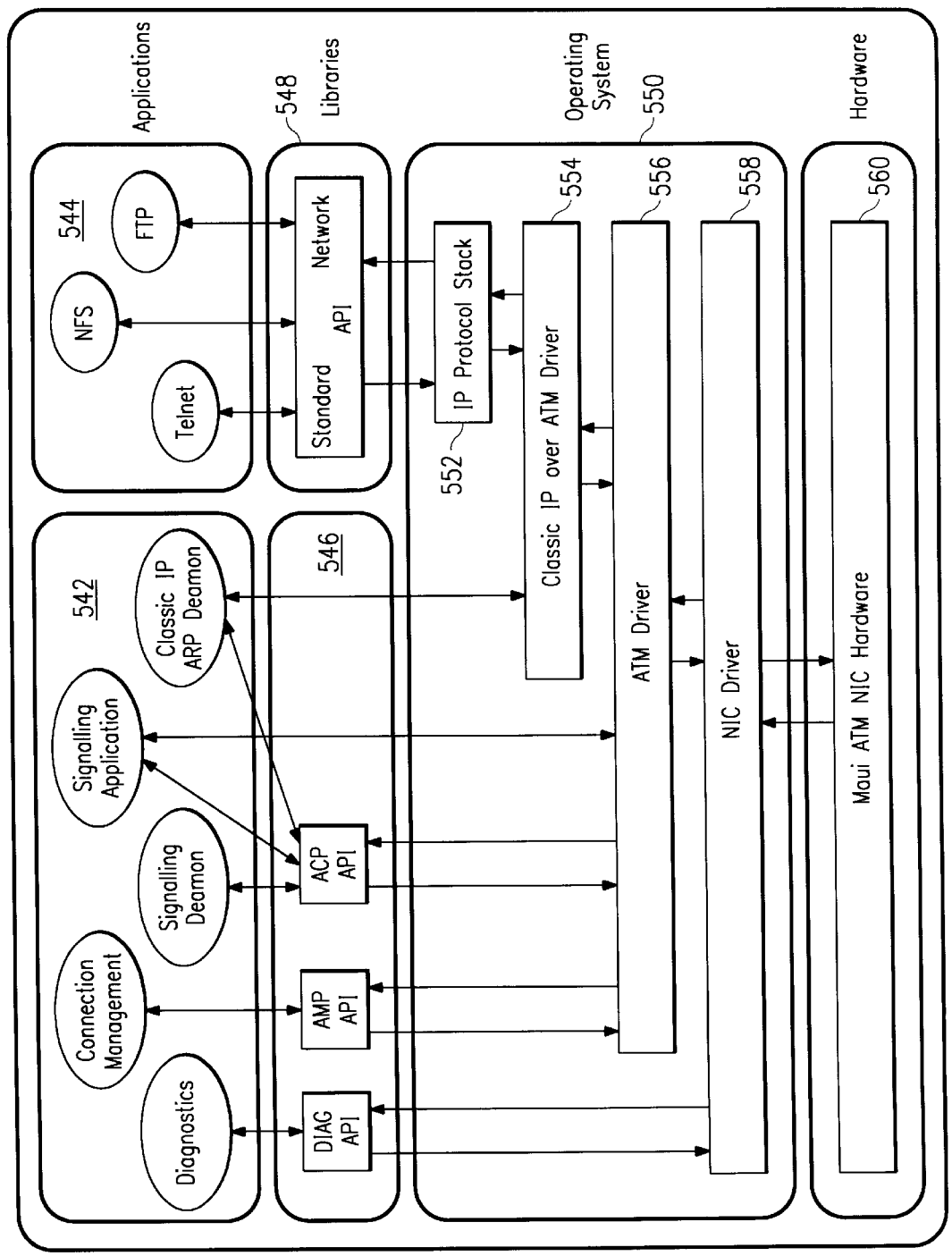
FIGS. 47 depicts in more general terms the application, libraries, operating systems, and hardware functions applicable to the present embodiment.

FIG. 47 shows the general architecture for ATM network interface controller of the present embodiment. Architecture 540 is composed of applications such as utility and functional applications 542 and telecommunications applications 544. These applications communicate with API's 546 that are ATM specific and API's 548 that are standard or generally used for the ATM network. The API's may be held in various libraries. At the operating system level 550 appear different operating modules. These include for example IP protocol stats 552 that communicates with classic IP or ATM driver software 554. Classic IP over ATM driver 554 communicates with ATM driver 556, which itself communicates with adapter driver 558. From the operating system 550 information flows between adapter driver 558 and the appropriate ATM adapter hardware 560.

OPERATION

The following description illustrates what takes place during segmentation and reassembly procedures with the present embodiment. The segmentation procedures include the events of (1) a host enqueing a PDU for DMA; (2) ATM ASIC 100 reading DMA transmit queue 22; (3) ATM ASIC 100 segmenting a PDU; and (4) the host changing something or the presence of error conditions. Reassembly procedures include the procedures for handling the events of (1) receiving a normal cell in ATM ASIC 100; (2) the host enqueuing something on DMA receive queue 450; (3) ATM ASIC 100 reading DMA receive queue 218 of memory map 200; (4) receiving an OAM cell through PHY interface circuit 130; (5) the host changing something; and (6) receiving an incomplete cell. Events (1) through (3) generally happen in sequence before a PDU is received and DMAed to host memory.

The first three of the above-listed segmentation procedures happen in sequence before a PDU is DMAed to adapter memory and finally transmitted. One of the first operations is the enqueing of a PDU for DMA by the host. When the host wants to transmit a PDU, it builds a DMA list for segmentation buffer 256 to be DMAed to adapter memory. The whole segmentation buffer 256 need not be stored in host memory and need not be DMAed at all.

The host can write the PDU trailer 282 word using a slave access and then the padding and trailer part can be skipped using JK descriptors. Segmentation buffer descriptor 258 can be written using normal slave accesses by the host and, in this case, a JK DMA descriptor would have to be setup. In principle, the whole of segmentation buffer 256 can be written manually by the host, and a JK DMA descriptor for the whole PDU would be required.

When setting up a DMA descriptor 254 targeted for a specific segmentation channel, the host has two options depending on whether the TX_LOCK_MODE (see FIG. 8) is set or cleared. If the TX_LOCK_MODE is set, the host must first determine if there is room in segmentation queue 252 for the channel. The host is required never to enqueue more for DMA than there is room for. The host can do this by keeping track of what has been enqueued for DMA and by reading the ReadPtr (see FIG. 17) in the segmentation control block (FIG. 32) for the segmentation channel to see where the segmentation engine 122 is at. If the DMA does overflow, ATM ASIC 100 will lock everything down (using TX_ENABLE, RX_ENABLE, and DMA_ENABLE) and generate the TX_DMA_OVFL interrupt for debugging purposes.

If there isn't room, the host can wait until it receives a TX_COMPLETE interrupt from the channel when the PDU finishes segmentation. On the other hand, if there is room, and if DMAWr_tx+1 is different from DMARd_tx, then the host sets up the DMA descriptor 254 in the DMA transmit queue 220 at address DMAWr_tx, and advances the DMAWr_tx. When setting up the last DMA descriptor 254, the host must set the End bit in the DMA descriptor 254 to true.

If TX_LOCK_MODE is cleared, then if DMAWr_tx+1 is different from DMARD_tx and the host can set up the DMA descriptor 254 in the DMA transmit queue 250 at address DMAWr_tx, and advance the DMAWr_tx. When setting up the last DMA descriptor 254, the host must set the End field 306 bit in the descriptor to true. If a DMA overflow does occur, the TX_DMA_OVFL interrupt is generated and DMA transfers are suspended until there is room again in the Segmentation buffer.

Note that in both cases the host is required to write the DMA descriptor 259 before advancing the DMAWr tx pointer. Otherwise, ATM ASIC 100 might start a DMA of garbage data. Also, note that the host is recommended to setup the descriptors for an entire segmentation buffer 256 before updating the DMAWr_tx pointer to the next free location in segmentation queue 252. This is to avoid idle time waiting for transmit descriptors while receive DMAs could have been performed. Also, note that if the host chooses to manually copy the whole PDU, then the host is required to make sure there is room in the buffer before copying data.

When ATM ASIC 100 reads DMA transmit queue 220, ATM ASIC 100 will continuously monitor DMA transmit queue 220 by corresponding the DMARd_tx and DMAWr_tx pointers. If something is enqueued in DMA transmit queue 220 and if DMA controller circuit 108 is not already engaged in another DMA transfer, then the DMA descriptor 254 is read from the queue.

DMA controller 108 of ATM ASIC 100 then uses the information in the read DMA descriptor 254 to do the actual DMA operation. The host address will be used to point to the source address in host memory, the value in count field 300 is the number of transfers required for this block of data, the Chan field 304 value identifies the segmentation control DescrStart parameter that will be loaded into the DMA write pointer which will be used to point to adapter memory. The End field 306 value, if set to True will cause a TX_DMA_COMPLETE interrupt to be generated when the DMA transfer is completed and the segmentation control DescrStart parameter to be advanced to the end of the DMAed segmentation buffer 256, which is loaded with the DMA Write Pointer. The Type field 310 identifies the type of the transfer. For example, if Type field 310 value is set to JK, it means that the DMA write pointer is loaded with the value in the Count field 300 and no DMA transfers are actually performed. As ATM ASIC 100 finishes processing each DMA descriptor 254, the DMARd_tx pointer is incremented to point to the next descriptor to be processed.

If a bus error occurs during the DMA transfer, then the DMA_ENABLE bit (FIG. 8) in the master control register will be cleared, thereby disabling all DMA operations. The host can then change the contents of the DMA descriptor 254 that was involved in the error, e.g., to type JK, and then re-enable DMAs by writing to the master control register. Furthermore, the host can read the offending virtual address in the DMA address register.

If during the DMA transfer the DMA write pointer gets too close to the ReadPtr for the channel ("too close" being defined as somewhere between 1 and 3 words away) then this is a DMA overflow and the TX_DMA_OVFL interrupt (FIG. 8) is generated. In the event that the TX_LOCK_MODE is set, this shall cause the TX_ENABLE, RX_ENABLE, and DMA_ENABLE bits to be cleared. This effectively freezes ATM ASIC 100 operations. The host can then do slave reads to debug what went wrong and a master reset or re-enable operation to start over. In the present embodiment, reset is recommended at this point. If the TX_LOCK_MODE is cleared, this causes the DMA transfers to be suspended until there is room in segmentation buffer 256 again.

When the segmentation engine 122 detects that the DescrStart and ReadPtr parameters have different values, and if it was not already doing a segmentation, it will start segmenting the segmentation buffer 256 in the segmentation queue 252 at the rate determined by peak cell rate circuit 240.

In this operation, ATM ASIC 100 will first read in the first word of the segmentation buffer descriptor 258. If the Identifier field 262 value is different from the expected unique identifier, ATM ASIC 100 is locked (using TX_ENABLE, RX_ENABLE, and DMA_ENABLE) and the TX_IDEN MISMATCH interrupt (FIG. 6) is generated. If the identifier is not different than expected, then VCI field 274, PTI field 276, CLP field 278, as well as the M field 264, Pr field 266, Rate Res field 268, and Cell Count field 276 are loaded into the segmentation control block (FIG. 32) and the ReadPtr is advanced. The M field 264 value determines what happens next.

If the M field 264 value indicates AAL5 transfer, then the PDU is segmented as an AAL5 PDU. The CRC is also initialized in segmentation control block. Then, the PDU is transmitted at the rate defined by prescale field 266 and rate resolution field 268 in the segmentation control block. As each cell is sent, CRC field 284 is updated and cell count field 270 is decremented. The ReadPtr is incremented for each read word in adapter RAM. VCI field 274, PTI field 276, and CLP field 278 are used in the header in each outgoing cell, while the rest of the header is zeroed. Note, however, that PTI field 276 is set to one. When the cell count field 270 value reaches zero, the last cell is processed specially. The PTI field 276 bit in the cell header is set to one, and the result of the CRC is inserted at the end of the cell.

If the M field is set to a non-AAL5 value, then segmentation buffer 256' is to be sent as non-AAL5 cells. The cells are transmitted at the rate defined by the prescale field 266 and rate resolution field 268 in the segmentation control block. The ReadPtr is incremented for each read word in adapter memory. VCL field 274, PTI field 276, and CLP field 270 are used in the header of each cell. The rest of the header is zeroed.

The host inherently has full control over the transmit direction. When the host wants to change the Size and/or location of segmentation queue 252 or an error condition exists, it should first wait until all the scheduled PDUs have been transmitted. When the host changes the Location/Size, the host is recommended to issue a JK DMA cycle with a count value of zero (i.e., address zero) as the first DMA descriptor for the channel. Also, when a software error condition exists or a RAM chip fails, for example, ATM ASIC 100 may generate error interrupts if a DMA overflow or invalid identifier field 262 value is detected. In this case, ATM ASIC 100 will lock down, but still allow software debugging operations. ATM ASIC 100 should be reset using the ATM ASIC 100 Reset register in this case.

FIG. 35 illustrates the operation of peak cell rate circuit 240. Peak cell rate circuit 240 receives input from internal register bus 238, two bits of which go to prescale circuit 314, while six bits go to rate resolution circuit 316. Output from prescale circuit 314 goes to prescaler 318, as does a 25 MHz clock signal which arrow 320 indicates. Counter 322 receives an input from rate resolution circuit 316 and from prescaler 318. Counter 322 outputs via line 324 to AND gate 326. AND gate 326 also receives TC input 328 from counter circuit 330. The logical AND output from AND gate 326 goes as an UP count signal to counter 330 at point 332. Counter circuit 330 also receives a DOWN input from grant signal 334 to produce an output Value 336 to arbiter circuit 232.

The follow discussion more specifically addresses operations of reassembly engine 124 according to the present embodiment. When ATM ASIC 100 receives a normal cell, it takes the received VCI and using this as the address does a lookup in VCI table 352 to read the stored information about this VCI. First, it reads the first 32 bits. A special exception is when the received cell PTI(2) bit is set. In that case the VCI descriptor PTI_mode field 372 determines whether the cell is to be trashed or directed to channel 3. Otherwise, Mode field 370 determines what happens to the cell. For example, if the Mode field value is set to Trashing, then the cell is trashed. The VCI Trash counter is then incremented. Furthermore, State field 394 is set to Trashing to indicate to the host that a cell was trashed with this VCI.

If the Mode field 370 value equals AAL5, then the cell is reassembled in the reassembly queue 366 for this VCI. In VCI table 352, DescrStart field 384, ReadPtr field 388, CellCount field, and State field are read from VCI descriptor 354 into the internal workspace and the working value for State field 394 determines what happens to the cell.

If the State field 394 value is Idle, this means that this cell must be the first cell of a PDU. If there is room in reassembly queue 366 for a new reassembly—buffer descriptor 402, i.e, if the ReadPtr field 388 value is different from the DescrStart field value plus 1, then the working value for WritePtr field 392 is set to the DescrStart field 384 working value, the CRC calc field 400 working value is initialized, the working CellCount field 398 value is cleared, and the State field 394 working value is changed from Idle to Reassembling. ATM ASIC 100 then writes values to Iden field 406, CLP field 408, and CE field 412 of reassembly buffer descriptor 402. In this operation, the content for CLP field 408 and CE field 412 are taken from the cell header. The working value for WritePtr field 392 of VCI table 352 is then incremented. ATM ASIC 100 then performs the normal reassembly operation as will be presently described.

If there is insufficient room for reassembly buffer descriptor 402, then ATM ASIC 100 writes back to the VCI descriptor 354 setting the State field 394 value to Trashing, except if this cell was the only cell on the PDU. This is determined by the PTI(0) bit being set. If so the State field 394 value is not changed from Idle. Furthermore, the Ovfl Trash (see FIG. 9) counter is incremented.

If State field 394 value equals Reassembling, then the cell is reassembled with whatever was already in reassembly buffer 368. ATM ASIC 100 reads the rest of VCI descriptor 352 into internal work space and first processes the cell header. ATM ASIC 100 checks the incoming PTI(1) bit (Congestion Experienced) in the cell header. If the PTI(1) bit set, ATM ASIC 100 will write back to Iden field 406 and CLP field 406 of the reassembly buffer descriptor 402 to which the value of DescrStart field 384 points.

ATM ASIC 100 then checks the incoming CLP field 408 bit in the cell header. If the CLP field 408 bit is set, ATM ASIC 100 will write back to Iden field 406 and CE field 412 in the reassembly buffer descriptor 402 pointed to by the working value of DescrStart field 384. If both the CE field 412 and CLP field 408 bits are to be set, ATM ASIC 100 can perform this write in parallel. After this step, the working value of CellCount field 398 is incremented by one.

As the cell payload is received from PHY interface circuit 130, the value in CRC calc field 400 is updated. ATM ASIC 100 continuously compares the working value of—WritePtr field 392 plus one with the working value of ReadPtr field 388 to avoid overflows as the cell is being written to reassembly buffer 368 and the working value of WritePtr field 392 incremented. If overflow occurs during the write operation, then the working value of State field 394 is changed to Trashing. In addition, if this was the last cell of the PDU (as determined by the PTI(0) bit being set), then the working value of State field 394 is changed to Idle, and the rest of the cell is trashed. Furthermore, the Cell count field 420 value in reassembly buffer descriptor 402 is updated with the working value for CellCount field 398, the T field 416 bit in reassembly buffer descriptor 402 is set, and the working value for DescrStart field 384 is incremented by one. If the working value for In Service field 380 is not set, then VCI descriptor In Service flag is set, without writing to the rest of the field, and the VCI is written to Service List 440 at ServWrite address 444. ServWrite address 444 is then incremented, and ATM ASIC 100 generates a SERVICE interrupt.

If overflow did not occur, then, if the received cell was the last of the PDU (as determined by the PTI(0) bit being set), and the working value of State field 394 is then changed to Idle. The CRC calc field 400 value is compared with the CRC field value in received cell's PDU trailer, and the result of the comparison (indicating the presence of error or not) is written to the CRC err field 418 of reassembly buffer descriptor 402. Furthermore, the T field 416 bit is set to zero and the Cell count field 420 in the reassembly buffer descriptor 402 is set to working value for CellCount field 98. The working value for DescrStart field 384 is set to the working value of WritePtr field 392. If the working value of In Service field 380 is not set, then the VCI descriptor 354 In Service flag is set, without writing to the rest of the word, and the VCI is written to Service List 440 at ServWrite address 444. ServWrite address 444 is then incremented, and ATM ASIC 100 then generates a SERVICE interrupt.

After these steps, WritePtr field 392, State field 394, CRC calc field 400, and CellCount field 398 are written back to VCI descriptor 354. If the value of DescrStart 384 changed, this is also written back, but without writing to ReadPtr field 388.

Note that the above sequence is not material, because in the present embodiment the host reacting on an interrupt is only given access to updated data pointers.

If the value of State field 394 is Trashing, the incoming cell is trashed. ATM ASIC 100 checks to see if this cell was the last cell on the PDU (by testing whether the PTI(0) bit is set). If so, the value of State field 394 is changed to Idle. Furthermore, the VCI-Trash (FIG. 9) counter is incremented.

If the value of Mode field 370 is non-AAL5, then no AAL5 processing is required and the cell is treated as a special one cell PDU. ATM ASIC 100 then reads the next 32 bits of VCI descriptor 354 into its internal work space. If there is room in reassembly queue 366 for a new reassembly buffer descriptor 402 (i.e., if the ReadPtr field 388 value is different from the DescrStart field 384 value plus one), then the working value for WritePtr field 392 is set to the working value for DescrStart field 384, and the WritePtr field 392 value is incremented.

If there is insufficient room for a reassembly buffer descriptor 402, then ATM ASIC 100 trashes the cell and increments the Ovfl-Trash counter (FIG. 9). As the cell is received from PHY interface circuit 130, ATM ASIC 100 continuously compares the working value of WritePtr field 392 plus one with the working value of ReadPtr field 388 to avoid overflows as the cell is being written to reassembly buffer 368 and the working value of WritePtr field 392 is incremented. Note that for non-AAL5 mode transfer, the cell header, except for the HEC, is written to the first four bytes of Data field 404 of reassembly buffer 368.

If overflow occurs during write, then the rest of the cell is trashed, and Iden field 406 is written, T field 416 bit in reassembly buffer descriptor 402 is set, and the working value of DescrStart field 384 is incremented by one. If the working value for In Service field 380 bit is not set, then the VCI descriptor 354 In Service flag is set, without writing to the rest of the word, and the VCI is written to Service List 400 at ServWrite address 444. ATM ASIC 100 then increments ServWrite address 444 and generates a SERVICE interrupt.

If overflow did not occur, then Iden field 406 is written to and the T field 416 bit is set to zero in the reassembly buffer descriptor 402. The working value of DescrStart field 384 is set to working value of WritePtr field 392. If the working value for In Service field 380 is not set, then the VCI descriptor 354 In Service flag is set, without writing to the rest of the word, and the VCI is written to Service List 440 at Servwrite address 444. ATM ASIC 100 then increments the ServWrite address 444 value and generates a SERVICE interrupt.

Finally, the DescrStart field value is written back to VCI descriptor 354, without writing to ReadPtr field 388. Again, the sequence of above operations is not material, because in the present embodiment when the host reacts on an interrupt it only receives access to updated data pointers and fields.

After ATM ASIC 100 generates a SERVICE interrupt to indicate that something has been moved to Service List 440, the interrupt causes the host to empty Service List 440, build the required DMA list, and enqueue the DMA descriptors 356 on DMA receive queue 218. The following discussion describes this process.

The host compares pointers of ServRead address 442, which is kept by the host, and ServWrite address 444, which is kept by the ATM ASIC 100 pointers to make sure that Service List 440 is not empty. Then the host reads the VCI entries in Service List 440 and increments the VCI number 446 of ServRead address 442 by one for each entry. In this operation, the host first clears the VCI descriptor 354 In Service bit for each VCI being serviced. The clearing of the In Service bit is done by rewriting the whole first 32 bits of VCI descriptor 354. If the host writes to the first word in VCI descriptor 354 for the VCI that is currently being reassembled, this will cause reassembly engine 124 to assume that In Service bit was cleared. This is to avoid race conditions between the host and reassembly engine 124.

The host keeps a pointer for each active VCI channel into the reassembly queue 366 that points to the next reassembly buffer descriptor 402 that has not yet been scheduled for DMA. This pointer is called Host_StartDescr. The host may also use other similar schemes for these steps.

The host uses the Host_StartDescr for the VCI read from Service List 440 to address reassembly buffer 368. The host should then read the fields in Reassembly buffer descriptor 402 to determine the status and the length of the PDU in the reassembly buffer 368. The host will then advance the Host_StartDescr parameter to the beginning of the next reassembly buffer descriptor that immediately follows the current buffer. Based on the acquired information and based on the structure and segmentation of the reserved memory areas in host memory, the host then builds up a DMA list for the Reassembly_buffer 368. Note that the DMA must include the total reassembly buffer 368 for this PDU. This does not mean, however, that the whole buffer must always be DMAed. Just-kidding DMAs can be used, if appropriate.

The DMA list for this Reassembly_buffer 368 is built by enqueuing a number of DMA descriptors 356 on the DMA receive queue 450. The host writes the DMA descriptor 356 to the address pointed to by DMAWr-rx and increments DMAWr_rx. This occurs, however, after comparing the value of DMAWr_rx with that of DMARd_rx+1 to make sure it does not overflow. If the particular block identified by this descriptor is not to be DMAed, the host will set the value of Type field 460 to JK (Just Kidding) and program Count field 452 accordingly. The VCI number is written to VCI field 454 of DMA descriptor 356. Note that the host is required to write the DMA descriptor 356 before advancing the DMAWr_rx pointer in the present embodiment, This prevents ATM ASIC 100 from starting DMA of garbage data. Also note that the host is recommended to setup DMA descriptors 354 for an entire reassembly 368 buffer before updating the DMAWR_rx pointer to the next free location in the queue. This is to avoid idle time waiting for receive descriptors while transmit DMAs could have been performed.

Finally, the host compares the VCI_descriptor 354 value for DescrStart field 384 the Host StartDescr parameter value. If they are not equal, another reassembly buffer 368 is ready to be DMAed and the host must service this reassembly buffer 368 as well.

ATM ASIC 100 continuously monitors the DMA receive queue 450 by comparing the DMARD_rx and DMAWR_rx pointers. If something is enqueued in DMA receive queue 450 and if the DMA controller 108 is not already engaged in another DMA transfer, then the DMA descriptor is read from DMA receive queue 450.

When this occurs, the DMA controller 108 uses the information in the read DMA descriptor 356 to do the actual DMA operation. The Host address will be used to point to the target address in host memory, the value of Count field 452 is then the number of transfers required for this block of data, the value of VCI field 454 identifies the VCI descriptor from ReadPtr field 388 which will be used to point to adapter memory. This value is written into an internal counter, incremented for each transfer, and then written back to ReadPtr field 388 of VCI descriptor 354 for each processed DMA descriptor. End field 456, if set to a True value will cause the RX DMA COMPLETE interrupt to be generated when the DMA transfer is complete. Type field 460 identifies the type of the transfer. Note that if the Type field 460 value is set to JK, it means that the VCI descriptor 354 ReadPtr field 388 is loaded with the value in Count field 452 and no DMA transfers are actually performed.

As ATM ASIC 100 finishes processing each DMA descriptor 356, it increments the DMARd_rx pointer to point to the next descriptor to be processed. If an error occurs during the DMA transfer, then the DMA_ENABLE bit in the master control register will be cleared disabling all DMA operations. The host can then change the contents of the DMA descriptor 354 that was involved in the error (e.g., to type JK) and then re-enable DMAs by writing to the master control register. Furthermore, the host can read the offending virtual address in the DMA_ADDR_register (see FIG. 11).

When an OAM cell is received, as determined by the PTI(2) bit being set in the header, ATM ASIC 100 uses the VCI_descriptor 354 PTI_mode field 372 to determine what happens to the cell. If the value in PTI_mode field 372 is a Trash value, then the cell is trashed and the VCI_Trash statistics counter is incremented. If the VCI_descriptor 354 Mode field 370 value for this VCI is set to Trash also, then the VCI_descriptor 354 State field 394 value is set to Trashing. This indicates to the Host that a cell was trashed with this VCI. Note that this information is only available when the Mode field 370 value equals a Trash value.

If PTI_mode field 372 value in VCI_descriptor 354 is a Preserve value, then ATM ASIC 100 automatically redirects this cell to the special OAM VCI channel 3. ATM ASIC 100 will read the VCI descriptor for VCI channel 3, ignoring the values of Mode field 370, PTI_mode field 372, and State field 394 and perform a non-AAL5 reassembly. It should be noted that in case of overflow in the reassembly queue 368 associated with VCI channel 3 there will not be room to store the cell headers for the different trashed cells. This means that the host does not know from which VCIs the OAM cells were trashed. because this was most likely already counted in the physical layer chip. For example, the reason for this phenomenon probably was that cell synchronization was temporarily lost in the physical layer chip. This event effectively causes an error at a higher layer (e.g., a CRC error for AAL5 traffic).

Note that a special case occurs when reassembly engine 124 reassembles a cell from the same VCI that is currently being DMAed to host memory. In this case, reassembly engine 124 uses the value of ReadPtr field 388 that being incremented in DMA Controller 108 for the comparison with the value in WritePtr field 392. This scheme can potentially save some memory space.

ALTERNATIVE EMBODIMENTS

There are any number of alternatives or changes in the an asynchronous transfer mode (ATM) adapter for providing ATM capability in a workstation or desktop environment within the scope of the present invention that may be readily apparent to one of ordinary skill in the art. Such alternatives may not be employed in the present embodiment for any number of reasons, such as costs and performance considerations, size constraints, availability of materials, arbitrary design decisions, and the like. A number of these alternatives have been mentioned above. Thus, the present invention is intended to be limited only by the claims which are meant to cover such obvious alternatives and deviations from the preferred design.

What is claimed is:

1. An apparatus for communicating data from a host to an ATM network and for communicating ATM cells from an ATM network to a host, the apparatus comprising:

a host bus interface circuit for communicating data with the host, the host bus interface circuit operating at a speed supplied by a bus of the host;

a physical interface circuit for communicating ATM cells with the ATM network;

a segmentation engine cooperating with the host bus interface circuit to receive data from the host, the segmentation engine segmenting the data into ATM cells, the segmentation engine further cooperating with the physical interface circuit for transferring the ATM cells to the ATM network;

a reassembly engine cooperating with the physical interface circuit to receive ATM cells from the ATM network, the reassembly engine reassembling the ATM cells into data, the reassembly engine further cooperating with the host bus interface circuit for transferring the data to the host; and wherein the host bus interface circuit, the physical interface circuit, the segmentation engine and the reassembly engine are formed as an integrated circuit for location at the host.

2. The apparatus according to claim 1 wherein the integrated circuit is an application specific integrated circuit.

3. The apparatus according to claim 1 further comprising:

a memory interface circuit formed in the integrated circuit, the memory interface circuit communicating with the segmentation engine and the host bus interface circuit to support the transfer of data from the host to the segmentation engine.

4. The apparatus according to claim 3 wherein the memory interface circuit further communicates with the reassembly engine to support the transfer of data from the reassembly engine to the host.

5. The apparatus according to claim 4 wherein the memory interface circuit comprises a RAM interface/arbiter circuit, the apparatus further comprising a DMA controller circuit formed in the integrated circuit, the DMA controller circuit communicating with the RAM interface/arbiter circuit to control memory access operations of the RAM interface/arbiter circuit.

6. The apparatus according to claim 1 wherein the host bus interface circuit comprises circuitry for interfacing an SBus.

7. The apparatus according to claim 1 wherein the host bus interface circuit comprises circuitry for interfacing a Peripheral Component Interconnect bus.

8. The apparatus according to claim 1 wherein the host bus interface circuit comprises circuitry for interfacing a GIO bus.

9. The apparatus according to claim 1 wherein the host is a desktop user station.

10. The apparatus according to claim 1 wherein the ATM network is a local ATM network.

11. The apparatus according to claim 5 further comprising a slave access control circuit formed in the integrated circuit, the slave access control circuit communicating with the RAM interface/arbiter circuit to interrupt data transfer under predetermined conditions.

12. The apparatus according to claim 11 further comprising:

an interrupt circuit associated with the slave access control circuit and the host to interrupt host operations under predetermined conditions; and a statistics circuit associated with the slave access control circuit for maintaining error statistics.

13. The apparatus according to claim 12 wherein the interrupt circuit and the slave access control circuit are formed in the integrated circuit.

14. The apparatus according to claim 11 wherein the host bus interface circuit, the DMA controller circuit and the slave access control circuit comprise a host interface circuit.

15. The apparatus according to claim 12 wherein the interrupt circuit and the statistics circuit are formed in the integrated circuit.

16. The apparatus according to claim 1 wherein the physical interface circuit comprises circuitry for interfacing a Utopia interface.

17. The apparatus according to claim 1 further comprising an adapter for adapting the integrated circuit to desktop applications.

18. An application specific integrated circuit for adapting a user end station to an ATM network, the application specific integrated circuit comprising:

a bus interface for communicating with the user end station, the bus interface operating at a speed supplied by a bus of the user end station;

a physical interface circuit for communicating with the ATM network;

a segmentation engine for segmenting user end station data into ATM formatted data, the segmentation engine communicating with the bus interface to receive user end station data, the segmentation engine further communicating with the physical interface circuit to transfer ATM formatted data to the ATM network;

a reassembly engine for generating user end station data from ATM formatted data, the reassembly engine communicating with the physical interface circuit to receive ATM formatted data, the reassembly engine further communicating with the bus interface to transfer user end station data to the user end station; and wherein the application specific integrated circuit is adapted for location at the user end station.

19. The application specific integrated circuit according to claim 18 further comprising a memory interface communicating with the reassembly engine to facilitate the generation of user end station data from ATM formatted data.

20. The application specific integrated circuit according to claim 19 wherein the memory interface further communicates with the segmentation engine to facilitate the segmentation of user end station data into ATM formatted data.

21. The application specific integrated circuit according to claim 19 further comprising a DMA control circuit communicating with the memory interface for controlling memory access operations.

22. The application specific integrated circuit according to claim 18 further comprising an interrupt circuit communicating with the user end station, the interrupt circuit operationally interrupting host operations under predetermined conditions.

23. The application specific integrated circuit according to claim 22 wherein the interrupt circuit comprises a disable timer for disabling the interrupt circuit for a predetermined time if a predetermined condition exists.

24. The application specific integrated circuit according to claim 19 wherein the memory interface comprises a plurality of pull-up and pull-down resistors for controlling associated register control bits to a configuration state according to the contents of registers associated with said register control bits.

25. The application specific integrated circuit according to claim 18 wherein the user end station is a desktop application.

26. An apparatus for communicating data from a host to an ATM network and for communicating ATM cells from an ATM network to a host, the apparatus comprising:

a host bus interface circuit for communicating with the host, the host bus interface circuit operating at a speed supplied by a bus of the host;

a physical interface circuit for communicating with the ATM network;

a segmentation engine that operates with the host to segment data in a memory into ATM cells and to transfer the ATM cells to the physical interface circuit;

a reassembly engine that operates with the host to receive ATM cells from the physical interface circuit and to reassemble the ATM cells into data in the memory; and wherein the host bus interface circuit, the physical interface circuit, the segmentation engine, and the reassembly engine are formed as an integrated circuit for location at the host.

27. The apparatus according to claim 26 wherein the integrated circuit is an application specific integrated circuit.

28. The apparatus according to claim 26 wherein the host is a desktop user station.

29. The apparatus according to claim 26 further comprising an adapter for adapting the integrated circuit to desktop applications.

30. The apparatus according to claim 26 further comprising a memory interface circuit formed in the integrated circuit, the memory interface circuit communicating with the segmentation engine and the host bus interface circuit to support communications between the host and the segmentation engine.

31. The apparatus according to claim 30 wherein the memory interface circuit further communicates with the reassembly engine to support communications between the host and the reassembly engine.

32. The apparatus according to claim 31 wherein the memory interface circuit comprises a DMA controller circuit formed in the integrated circuit.

33. The apparatus of claim 29, wherein the memory is at the host.

34. An application specific integrated circuit for adapting a user end station to an ATM network, the application specific integrated circuit comprising:

a bus interface for communicating with the user end station, the bus interface operating at a speed supplied by a bus of the user end station;

a physical interface circuit for communicating with the ATM network;

a segmentation engine that operates with the user end station to segment data in a memory into ATM formatted data and to communicate the ATM formatted data to the physical interface circuit;

a reassembly engine that operates with the user end station to receive ATM formatted data from the physical interface circuit and to generate user end station data from the ATM formatted data in the memory; and wherein the application specific integrated circuit is adapted for location at the user end station.

35. The application specific integrated circuit according to claim 34 wherein the user end station is a desktop user station.

36. The application specific integrated circuit according to claim 34 further comprising an adapter for adapting the application specific integrated circuit to desktop applications.

37. The application specific integrated circuit according to claim 34 further comprising a memory interface communicating with the reassembly engine to facilitate the generation of user end station data from ATM formatted data.

38. The application specific integrated circuit according to claim 37 wherein the memory interface further communicates with the segmentation engine to facilitate the generation of user end station data into ATM formatted data.

39. The application specific integrated circuit according to claim 37 wherein the memory interface comprises a DMA controller.

40. The application specific integrated circuit according to claim 37 wherein the memory interface comprises a plurality of pull-up and pull-down resistors for controlling associated register control bits to a configuration state according to the contents of registers associated with said register control bits.

41. The application specific integrated circuit according to claim wherein the memory is at the user end station.

42. An apparatus for communicating data from a host to an ATM network and for communicating ATM cells from an ATM network to a host, the apparatus comprising:

a bus interface circuit for communicating with the host, the bus interface circuit operating at a speed supplied by a bus of the host;

a physical interface circuit for communicating ATM cells with the ATM network;

a first memory buffer for storing an ATM cell that has been segmented from data in a memory and is awaiting communication to the physical interface;

a second memory buffer for storing an ATM cell that has been received from the physical interface and is awaiting to be reassembled into data in the memory; and wherein the bus interface circuit, the physical interface circuit, the first memory buffer, and the second memory buffer are adapted for location at the host.

43. The apparatus according to claim 42 wherein the bus interface circuit and the physical interface circuit are formed as part of an application specific integrated circuit.

44. The apparatus according to claim 42 wherein the bus interface circuit, the physical interface circuit, the first memory buffer, and the second memory buffer are formed as part of an application specific integrated circuit.

45. The apparatus according to claim 42 further comprising a DMA controller for communicating between the host and the apparatus.

46. The apparatus according to claim 45 wherein the apparatus notifies the host that an error occurred during a communication of data by the DMA controller.

47. The apparatus according to claim 42 wherein the apparatus notifies the host when the second buffer has data to be communicated to the host.

48. The apparatus according to claim 42 wherein the apparatus notifies the host when all of the cells for a protocol data unit have arrived.

49. The apparatus according to claim 42 wherein the memory is at the host. the host is a desktop user station.

50. An apparatus for communicating data from a host to an ATM network and for communicating ATM cells from an ATM network to a host, the apparatus comprising:

a host bus interface circuit for communicating data with the host;

a physical interface circuit for communicating ATM cells with the ATM network;

a segmentation engine cooperating with the host bus interface circuit to receive data from the host, the segmentation engine segmenting the data into ATM cells, the segmentation engine further cooperating with the physical interface circuit for transferring the ATM cells to the ATM network;

a reassembly engine cooperating with the physical interface circuit to receive ATM cells from the ATM network, the reassembly engine reassembling the ATM cells into data, the reassembly engine further cooperating with the host bus interface circuit for transferring the data to the host;

a memory interface circuit communicating with the segmentation engine and the host bus interface circuit to support the transfer of data from the host to the segmentation engine and with the reassembly engine to support the transfer of data from the reassembly engine to the host, the memory interface circuit comprising a RAM interface/arbiter circuit;

a DMA controller circuit communicating with the RAM interface/arbiter circuit to control memory access operations of the RAM interface/arbiter circuit; and wherein the host bus interface circuit, the physical interface circuit, the segmentation engine, the reassembly engine, the memory interface circuit and the DMA controller circuit are formed as an integrated circuit for location at the host.

51. The apparatus according to claim 50 wherein the integrated circuit is an application specific integrated circuit.

52. The apparatus according to claim 50 wherein the host bus interface circuit comprises circuitry for interfacing an SBus.

53. The apparatus according to claim 50 wherein the host is a desktop user station.

54. The apparatus according to claim 50 wherein the ATM network is a local ATM network.

55. The apparatus according to claim 50 further comprising a slave access control circuit formed in the integrated circuit, the slave access control circuit communicating with the RAM interface/arbiter circuit to interrupt data transfer under predetermined conditions.

56. The apparatus according to claim 55 further comprising:

an interrupt circuit associated with the slave access control circuit and the host to interrupt host operations under predetermined conditions; and a statistics circuit associated with the slave access control circuit for maintaining error statistics.

57. The apparatus according to claim 56 wherein the interrupt circuit and the slave access control circuit are formed in the integrated circuit.

58. The apparatus according to claim 56 wherein the host bus interface circuit, the DMA controller circuit and the slave access control circuit comprise a host interface circuit.

59. The apparatus according to claim 56 wherein the interrupt circuit and the statistics circuit are formed in the integrated circuit.

60. The apparatus according to claim 50 wherein the physical interface circuit comprises circuitry for interfacing a Utopia interface.

61. The apparatus according to claim 50 further comprising an adapter for adapting the integrated circuit to desktop applications.

* * * * *